(12) United States Patent
McGregor et al.

(10) Patent No.: US 10,515,331 B1
(45) Date of Patent: Dec. 24, 2019

(54) SYSTEM AND METHOD FOR EVALUATING INDIVIDUALS AND MODELING COMPENSATION LEVELS

(71) Applicant: VEGA FACTOR INC., New York, NY (US)

(72) Inventors: Lindsay E. McGregor, New York, NY (US); Neel J. Doshi, New York, NY (US); Mary W. Miller, Charlestown, MA (US)

(73) Assignee: Vega Factor Inc., New York, NY (US)

( * ) Notice: Subject to any disclaimer, the term of this patent is extended or adjusted under 35 U.S.C. 154(b) by 223 days.

(21) Appl. No.: 15/604,167

(22) Filed: May 24, 2017

Related U.S. Application Data

(60) Provisional application No. 62/342,608, filed on May 27, 2016.

(51) Int. Cl.
*G06Q 10/06* (2012.01)
*G06N 5/02* (2006.01)

(52) U.S. Cl.
CPC ....... *G06Q 10/06398* (2013.01); *G06N 5/022* (2013.01)

(58) Field of Classification Search
CPC ........... G06Q 10/105; G06Q 10/06398; G06Q 40/125; G06Q 10/0639; G06Q 50/2057; G06Q 10/06
See application file for complete search history.

(56) References Cited

U.S. PATENT DOCUMENTS

| | | | | |
|---|---|---|---|---|
| 5,926,794 A * | 7/1999 | Fethe | ............... | G06Q 10/06393 705/7.39 |
| 6,119,097 A * | 9/2000 | Ibarra | .............. | G06Q 10/06398 705/7.42 |
| 7,483,843 B2 * | 1/2009 | Honda | ............. | G06Q 10/06375 705/7.37 |
| 8,082,168 B1 * | 12/2011 | Judy | .............. | G06Q 10/063112 705/7.14 |
| 8,238,541 B1 * | 8/2012 | Kalavar | ............... | H04M 3/5233 379/265.06 |
| 8,473,320 B1 * | 6/2013 | Judy | .................... | G06Q 10/105 705/7.14 |
| 8,589,218 B2 * | 11/2013 | Koller | .................. | G06Q 10/105 705/14.1 |
| 8,768,752 B1 * | 7/2014 | Buckelew | ........ | G06Q 10/06398 705/7.42 |

(Continued)

OTHER PUBLICATIONS

Herner, Mykkah et al., How to Build Pay Grades and Salary Ranges PayScale, 2013 (Year: 2013).*

(Continued)

*Primary Examiner* — Scott L Jarrett
(74) *Attorney, Agent, or Firm* — Morse, Barnes-Brown & Pendleton, P.C.; Sean D. Detweiler, Esq.

(57) ABSTRACT

The present invention relates to a system and method suitable for objectively evaluating individuals within an organization. In particular, the present invention relates to a system and method for objectively and consistently evaluating individuals for knowledge, training, and compensation within an organization, and across industries. Further the system and method provides models that enable individuals to identify skill that can be altered in a manner that dictates a desired career path and compensation range for the individual.

15 Claims, 16 Drawing Sheets

(56) References Cited

U.S. PATENT DOCUMENTS

| | | | | |
|---|---|---|---|---|
| 9,032,311 | B2* | 5/2015 | Mahadevan | G06Q 10/06 715/762 |
| 9,832,159 | B1* | 11/2017 | Kursun | H04L 51/16 |
| 2002/0035506 | A1* | 3/2002 | Loya | G06Q 10/06 705/14.19 |
| 2002/0055870 | A1* | 5/2002 | Thomas | G06Q 10/06 705/7.14 |
| 2002/0062242 | A1* | 5/2002 | Suzuki | G06Q 10/10 705/7.42 |
| 2004/0210820 | A1* | 10/2004 | Tarr | G06Q 10/0639 715/230 |
| 2005/0216326 | A1* | 9/2005 | Inoue | G06Q 10/06 702/187 |
| 2007/0298392 | A1* | 12/2007 | Mitchell | G09B 19/00 434/219 |
| 2008/0065467 | A1* | 3/2008 | Nyegaard | G06Q 10/00 705/7.32 |
| 2009/0210331 | A1* | 8/2009 | Boone | G06Q 10/10 705/32 |
| 2009/0276231 | A1* | 11/2009 | Bazigos | G06Q 10/105 705/320 |
| 2010/0274620 | A1* | 10/2010 | Upadhyaya | G06Q 10/06 705/7.15 |
| 2011/0295759 | A1* | 12/2011 | Selvakummar | G06Q 10/063112 705/321 |
| 2012/0232944 | A1* | 9/2012 | Zhu | G06Q 10/063112 705/7.14 |
| 2012/0278713 | A1* | 11/2012 | Roopan | G06Q 10/105 715/706 |
| 2012/0330855 | A1* | 12/2012 | Maxwell | G06Q 10/00 705/320 |
| 2013/0031015 | A1* | 1/2013 | Schneider | G06Q 10/063112 705/321 |
| 2013/0218619 | A1* | 8/2013 | Friedlander | G06Q 10/063112 705/7.14 |
| 2013/0224698 | A1* | 8/2013 | Gillam | G06Q 10/00 434/219 |
| 2014/0207503 | A1* | 7/2014 | Reis | G06Q 10/06311 705/7.13 |
| 2014/0278821 | A1* | 9/2014 | McConnell | G06Q 10/0639 705/7.38 |
| 2015/0193737 | A1* | 7/2015 | Jadia | G06Q 10/1053 705/80 |
| 2016/0379170 | A1* | 12/2016 | Pande | G06Q 10/06 705/321 |
| 2017/0076244 | A1* | 3/2017 | Bastide | G06F 16/288 |
| 2017/0154307 | A1* | 6/2017 | Maurya | G06Q 10/1053 |

OTHER PUBLICATIONS

Milkovich et al., Compensation: Person-Based Structures—Chapter 6 McGraw Hill, 2005 (Year: 2005).*

Atchison, Thomas J. et al., Internet Based Benefits & Compensation Administration—Chapter 15: Competency Based Pay ERI Economic Research Institute, 2013 (Year: 2013).*

Gascoigne, Joel et al., Introducing the New Buffer Salary Formula, Calculate Your Salary App and The Whole Team's New Salaries Buffer.com, Nov. 29, 2015, Retrieved from Archive.org (Year: 2015).*

Gascoigne, Joel et al., Introducing Open Salaries at Buffer Buffer.com, Dec. 14, 2015, Retrieved from Archive.org (Year: 2015).*

Ledford, Greald E. Jr. et. al., Skill-Based Pay Society for Human Resource Management, Jun. 2011 (Year: 2011).*

Rewards Can Make a Difference Colorado University, Sep. 20, 2006, Retrieved from Archive.org (Year: 2006).*

Reward Systems Fall 2008 (Year: 2008).*

* cited by examiner

| | LEARNING | DOING | | AMPLIFYING | | |
|---|---|---|---|---|---|---|
| NOT PRIORITIZED | ACTIVELY LEARNING | DOING | READY TO TEACH (EXPERT) | TEACHING | TOOL BUILDING | INVENTING |
| NOT ACTIVELY LEARNING THE SKILL; MAY NOT BE RELEVANT TO CURRENT JOB OR NOT PRIORITIZED AT THE MOMENT. | ACTIVELY LEARNING THE SKILL (E.G., SEEKING APPRENTICESHIP, TAKING COURSES, RESEARCHING BEST PRACTICES) | DOING THE SKILL IN A HIGH QUALITY WAY AS EXEMPLIFIED BY THE EXAMPLES. | DOING THE SKILL WITH EXCELLENCE. READY TO TEACH INCLUDES AWARENESS OF THE THEORY BEHIND THE ACTIVITY (E.G., WHY THE SKILL IS IMPORTANT, HOW THE SKILL CREATES VALUE FOR THE ORGANIZATION), OTHERS IN YOUR TEAM SHOULD WANT YOU TO TEACH THIS SKILL. | TEACHING THE SKILL TO OTHERS AT A LEVEL AND BREADTH THAT CREATES SUBSTANTIAL VALUE FOR THE ORGANIZATION. THIS INCLUDES COACHING AND CAPABILITY BUILDING. | BUILDING TOOLS THAT ALLOW MULTIPLE INDIVIDUALS TO INCREASE THEIR PRODUCTIVITY IN A MEANINGFUL, MEASURABLE WAY. | INVENTING NEW KNOWLEDGE, ANALOGOUS TO CREATING A NEW LINE OF BUSINESS OR WAY OF CONDUCTING BUSINESS. |

VEGA

Skill builder | Habit builder | Org builder

My Views

- Endorser Person
- People I coach
- My peers
- My organization

My Teams

- EndorserPOD (leader)

Hi there, Endorser

Lots of awesome stuff is happening around you and your input matters.

Let's return the favor and help out 1 colleague and 1 team?

Shall we?

[For sure]

APR 27 HELPEES

504

MINDSET
Tomo

Tomo measures why people do their work. It increases with more play, purpose and potential. It decreases with emotional pressure, economic pressure and inertia. Scores can range from -100 to +100.

YOU:
NOT YET AVAILABLE

VEGA | Skill builder | Habit builder | Org builder

TUNE-UP FOR APR 27 2017
OVERVIEW OF THE WEEK

GENERAL

Innovation opportunity

SKILL DEVELOPMENT

Endorsee Person
Endorsee Person

UNFINISHED TUNE-UPS

Apr 27 2017

SKILL DEVELOPMENT
A colleague needs your help.

Please check all that apply.

☑ This person is able to practice this skill independently and consistently without significant coaching or quality control.

☑ This person practices this skill proactively (i.e., without their manager having to ask them).

☑ This person could practice this skill in other types of roles that use this skill besides the current role.

☑ This person can identify new learning opportunities and self-manage their ongoing development.

ADVICE FOR ENDORSEE
You're all done, nice job!

[ I don't have enough context ] [ Goal is complete! ] [ Not just yet ]

33% completed

*Fig. 9E*

SYSTEM AND METHOD FOR EVALUATING INDIVIDUALS AND MODELING COMPENSATION LEVELS

CROSS-REFERENCE TO RELATED APPLICATION

This application claims priority to, and the benefit of, U.S. Provisional Application No. 62/342,608, filed May 27, 2016, for all subject matter common to both applications. The disclosure of said provisional application is hereby incorporated by reference in its entirety.

FIELD OF THE INVENTION

The present invention relates to a system and method suitable for evaluating individuals within an organization and predictive modeling of compensation. In particular, the present invention relates to a system and method for evaluating individuals in areas including knowledge, training, and compensation, and then modeling compensation levels based on existing evaluation criteria and/or predicted future evaluation criteria, enabling individual employees to adapt their desired career path.

BACKGROUND

Any job, team, or organization must balance two types of performance. The first type is known as tactical performance. Tactical performance is how effectively your organization executes its plan. Tactical performance is the driver of focus and consistency; it allows organizations to increase strength by directing limited resources to the fewest targets. Starbucks® baristas that make a latte the same way across different café s, or software engineers that deliver the expected amount of code each day, are examples of tactical performance. The second type of performance is known as adaptive performance. Adaptive performance relates to how effectively an organization diverges from its plan and manifests as creativity, problem solving, grit, innovation, and citizenship. Adaptive performance allows organizations to create value through the unknown (i.e., the VUCA—volatility, uncertainty, complexity, and ambiguity). An example of adaptive performance is when a sales person tailors their approach for a customer, or seen an engineer helps a colleague solve a problem. Because the basis for tactical performance and adaptive performance are conflicting, organizations and individuals must seek a balance between the two types of performance. One key concept for achieving this balance is realized in the notion that why we work determines how well we work.

There have been numerous studies conducted with workers to measure how different motivations affect the quality of the work product. Six main reasons or motivations for why people work can be summarized through play, purpose, potential, emotional pressure, economic pressure, and inertia. These motivations can be defined as follows: Play s when you are motivated because you enjoy the work itself, Purpose is when you work because you value the work's impact, Potential is when the outcome of the work benefits your identity, Emotional pressure is when you continue to do the work you do because you are afraid of disappointing yourself or others, Economic pressure is when you work to gain a reward or avoid a punishment, and Inertia is when the motive is so far removed from the work and your identity that you can't identify why you're working; you continue to do the work you do largely because you're already doing it.

Some researchers have concluded that the first three motives tend to increase performance, while the latter three hinder performance. The first three motivations can be directly connected to the work itself, while the latter three motivations are indirectly related to the work. These indirect motives tend to reduce performance because you're no longer thinking about the work—you're thinking about the disappointment, or the reward, or why you're bothering to do it at all.

To optimize worker productivity, organizations should increase the first three motivations while reducing the latter three motivations to create a total motivation type environment. By enabling total motivation ("tomo"), the organizations will increase worker productivity and customer satisfaction (resulting from motivated and more effective employees). This type of increased performance is not limited to a single industry or type of organization but can be found effective across any industry (e.g., retail, banking, telecommunications, the fast food industry, etc.).

One way to summarize how motivated workers are within an organization is to identify the organization culture. In particular, culture is the set of processes or elements within an organization that affect the total motivation of its people. In a high-performing culture, those processes or elements maximize total motivation. One of the most sensitive elements is the career ladder within an organization. Thus, for a company to create a high performing culture, it is essential that its systems of performance management (e.g., performance evaluation), compensation, and career development are constructed in a way that maximizes total motivation.

Generally, organizations rely on performance evaluations of individuals to determine compensation and career development. Typically, performing evaluations for individuals within an organization includes reviewers and reviewees filing out generic review forms following a generic rating system. Individuals are typically reviewed on the same generic scales, regardless of position and experience within an organization. Individuals are typically rated using generic subjective ratings such as satisfactory, unsatisfactory, needs improvement, meets expectations, etc. Organizations rely on these ratings to determine performance of an individual as well as provide a baseline for compensation and bonus to be paid to that individual.

Conventionally, base compensation for an individual is typically set by a title or level of the individual within an organization, and the initial compensation is often negotiated at hire. Traditionally, a bonus and sometimes the base compensation for an individual are determined using one of four techniques, each of which are fundamentally flawed because they do not lead to total motivation of the individual. The four techniques include metric based (e.g., commission, hourly, etc.), competency based (e.g., knowledge base, performance evaluation, etc.), rating/ranking based, and at the discretion of a superior.

In metric-based systems, performance is judged on objective measures, such as revenue, a net promoter score, number of widgets produced, or even hours worked. Metric-based systems focus individuals on near-term performance, rather than learning or development. These systems tend to define outcomes narrowly and often miss the true drivers of value creation. The narrowing of a field of vision of an individual can lead to distraction, cancellation, and cobra effects. The distraction effect leads to individuals chasing the metrics rather than focusing on the rate of improvement of productivity. The cancellation effect causes individuals to perform the minimum to check the boxes of whatever metrics are being measured. The cobra effect causes individuals to be deceptive to achieve their target metric(s). These are textbook examples of maladaptive phenomena resulting from low-total motivation processes that rely on emotional pressure, economic pressure, and inertia.

In a competency-based system, leaders evaluate individual performance against a selected set of behaviors or competencies. In most organizations, this model has five to ten competencies, like "teamwork," "problem solving," "communications", etc. These competencies tend to be generic across roles and functions, and connect loosely to value. Because the competencies are generic, they penalize individuals with technical expertise. These competencies tend to be evaluated on a "competency scale" which ranges from competent to incompetent. The competency scale is uncomfortable for supervisors to use and motivationally negative for employees, and thus not accurate. Worse still, the constant fear of judgment reduces learning or "amplifying" of skills by individuals within an organization. Lastly, the coarseness of the competencies and the rating scale makes the system highly subjective and prone to human biases.

In a ratings/rankings based system, leader judgment is used to rate or rank individual performances (e.g., through a generic performance evaluation). The ratings/rankings systems incentivize individuals to focus on self-centric behavior and competition, rather than working to benefit the team. This detracts from adaptive performance, and can even lead to sabotage. The ratings/rankings based system can create extreme stress and reinforce many forms of bias. Additionally, the quality of work can decline when individuals are distracted by ratings and rankings.

Organizations that have no formal model tend to use leader discretion systems. In absence of a formal model, leaders have complete discretion on how to dole out rewards and punishments. This magnifies leader biases, and causes individuals to focus on pleasing their direct managers rather than acting in the best interest of the organization. These systems can reduce diversity, and lead to success through nepotism.

All of these methodologies experience shortcomings that reduce total motivation of individuals, thus making these methodologies ill-suited for producing high performing cultures within an organization. In particular, the generic rating systems applied across various work groups do not provide individuals with tailored and objectively consistent feedback and direction in their career path. Additionally, each of these performance management systems drives negative consequences relating to performance of individuals within an organization, including increased gamesmanship as employees try to beat the system and promote themselves at the expense of others. Similarly, it is difficult to determine appropriate compensation for individuals because it is difficult to objectively and consistently rate their work product, habits, and production. Therefore, compensation is generally based on years of experience in a particular field or other subjective factors but rarely factor in skills that the individual has learned or mastered over those years of experience. The subjectivity of conventional compensation approaches also results in biases in pay that often equate to evaluation based on gender and race, among other factors indeterminate of an employee's contributions or value. Furthermore, conventional evaluation and compensation approaches utilized by organizations do not actively encourage learning and teaching, resulting in side effects like knowledge hoarding and deception.

SUMMARY

There is a need for a system and method for objectively and consistently evaluating individuals across industries in areas including knowledge, training, and compensation. There is further a need for a system and method that enables individuals to identify characteristics that can be altered in a manner suggesting a career path and a predicted fair and unbiased compensation range across generalist roles, technical roles, leadership roles, and front-line roles. Additionally, there is a need for encouraging adaptive performance for every individual in an organization to learn new ways to improve performance and then amplify what they have learned to the whole organization. There is also a need for a system and method to increase teamwork while still differentiating between individuals and make it easier to coach and develop individuals. Accomplishing these objectives will lead to an increase in total motivation, leading to higher organizational performance, and improving business outcomes.

The present invention is directed toward further solutions to address these needs, in addition to having other desirable characteristics. Specifically, the present invention relates to a system and method for evaluating skills for individuals within an organization in an objective and consistent manner across a given industry through a unique analyzer process. Additionally, the present invention identifies and eliminates negative motivations such as gamesmanship. The benefits of the present invention are realized through the implementation of a specific combination of steps that make up the system and method of the present invention. In particular, the specific combination of steps, provided by the present invention, amount to more than conventionally known techniques and steps merely implemented in a computer platform. Instead, the specific and unique combination of steps provided by the present invention were not previously implemented manually or implemented by a computer system. In particular, these steps provide a specific combination of steps using an unconventional combination of rules to enable an improved method for evaluating individuals, determining fair compensation, and increasing total motivation and productivity of those individuals. The present invention integrates multiple components: coaching and development, training, recruiting, career ladders, and compensation into a single model. The system and method of the present invention further utilizes evaluations of skills to identify individual characteristics and how they can be altered in a manner that suggests career paths and predicts future compensation for the individual in a manner that increases total motivation and thus productivity of the individual.

In accordance with an example embodiment of the present invention, a method of modeling compensation level determinations includes a user interface receiving a skill stage for each skill in a collection of skills associated with an individual, the skill stage indicating a level of mastery the individual has obtained in each skill. A skills map and user assessment module determines a skill weight for each received skill stage for each skill in the collection of skills, where the skill weight is a predetermined value multiplier based on the skill stage. The skills map and user assessment module identify one or more skill values assigned to each skill in the collection of skills, each of the one or more skill values associated with a value multiplier. The skills map and user assessment module calculate an average skill value for each skill in the collection of skills by averaging all value multipliers associated with the one or more skill values. The skills map and user assessment module transform the skill weight for each skill in the collection of skills into a weighted skill weight for each skill in the collection of skills, wherein transforming comprises multiplying the average skill value for each skill in the collection of skills by the predetermined value multiplier of the skill weight for each skill in the collection of skills. The skills map and user assessment module calculate total skill weights for the individual by summing the weighted skill weight for each skill in the collection of skills. A compensation calculation module calculates a compensation level determination for the individual by obtaining a product of the total skill weights multiplied by a predetermined monetary market value per skill weight.

In accordance with aspects of the present invention, the one or more skill values are one of a low quantity, medium quantity, high quantity, and very high quantity, and indicate a relative level of importance of an associated skill to an organization. The one or more skill values can be provided by a weighting table for skill stages. The value multiplier can be a predetermined quantity associated with a level of skill. The method can further include determining a compensation level for the individual based on the total skill weights for the individual. Determining the compensation level comprises calculating a product of the total skill weights multiplied by a predetermined monetary market value per skill weight.

In accordance with aspects of the present invention, the method can further include receiving a plurality of skill stages on a scale between an X quantity and a Y quantity for each skill of the plurality of skills of the individual, with the X quantity being a lowest quantity and the Y quantity being a highest quantity. Each of the plurality of skill stages can be associated with a subcategory of a plurality of subcategories, the plurality of subcategories in ascending order consisting of a not-prioritized level, a prioritized level, a doing level, a ready to teach level, a teaching level, a tool-builder level, and an inventing level, in such a way that the X quantity is within the not-prioritized level subcategory and the Y quantity is within the inventing level subcategory, and transforming the plurality of skill stages each being associated with a skill weight, into an average skill weight.

In accordance with example embodiments of the present invention, a method for modeling endorsement of skills of an individual in a skills map is provided. The method includes providing a skills map including a collection of skills associated with an individual and providing an initial skill stage for each skill in the collection of skills of the skills map, the skill stage indicating a level of mastery the individual has obtained in each skill. The method also includes receiving at least one endorsement request for a skill stage modification to a skill in the collection of skills from the individual, selecting at least one endorser to review the at least one endorsement request, and receiving, from the at least one endorser, one of an endorsement, a negative endorsement, or a skip for the endorsement request.

In accordance with aspects of the present invention, the at least one endorsement request is one of a skill claim or a skill goal submission for a new skill stage of a previously existing skill or a new skill to be added to the skills map. The at least one endorsement request can also be placed in an endorsement request queue for the at least one endorser.

In accordance with aspects of the present invention, the method further includes displaying the at least one endorser, one of an endorsement, a negative endorsement, or a skip for the endorsement request to the individual.

In accordance with example embodiments of the present invention, a system for endorsing skills of an individual in a skills map is provided. The system includes a skills map and user assessment module that provides a skills map including a collection of skills associated with an individual. The skills map and user assessment module provides an initial a skill stage for each skill in the collection of skills of the skills map, the skill stage indicating a level of mastery the individual has obtained in each skill. The skills map and user assessment module receives, from a graphical user interface, at least one endorsement request for a skill stage modification to a skill in the collection of skills from the individual. The skills map and user assessment module selects at least one endorser to review the at least one endorsement request. The skills map and user assessment module receives, from the at least one endorser, one of an endorsement, a negative endorsement, or a skip for the endorsement request.

BRIEF DESCRIPTION OF THE FIGURES

These and other characteristics of the present invention will be more fully understood by reference to the following detailed description in conjunction with the attached drawings, in which:

FIG. 2 is an illustrative example of a skill assessment progression, in accordance with aspects of the present invention;

FIGS. 5A, 5B, and 5C are exemplary views of excerpts from a skills map, in accordance with aspects of the present invention;

FIGS. 9A, 9B, 9C, 9D, and 9E are exemplary graphical user interfaces for skill endorsement, in accordance with aspects of the present invention.

DETAILED DESCRIPTION

Figure 1:
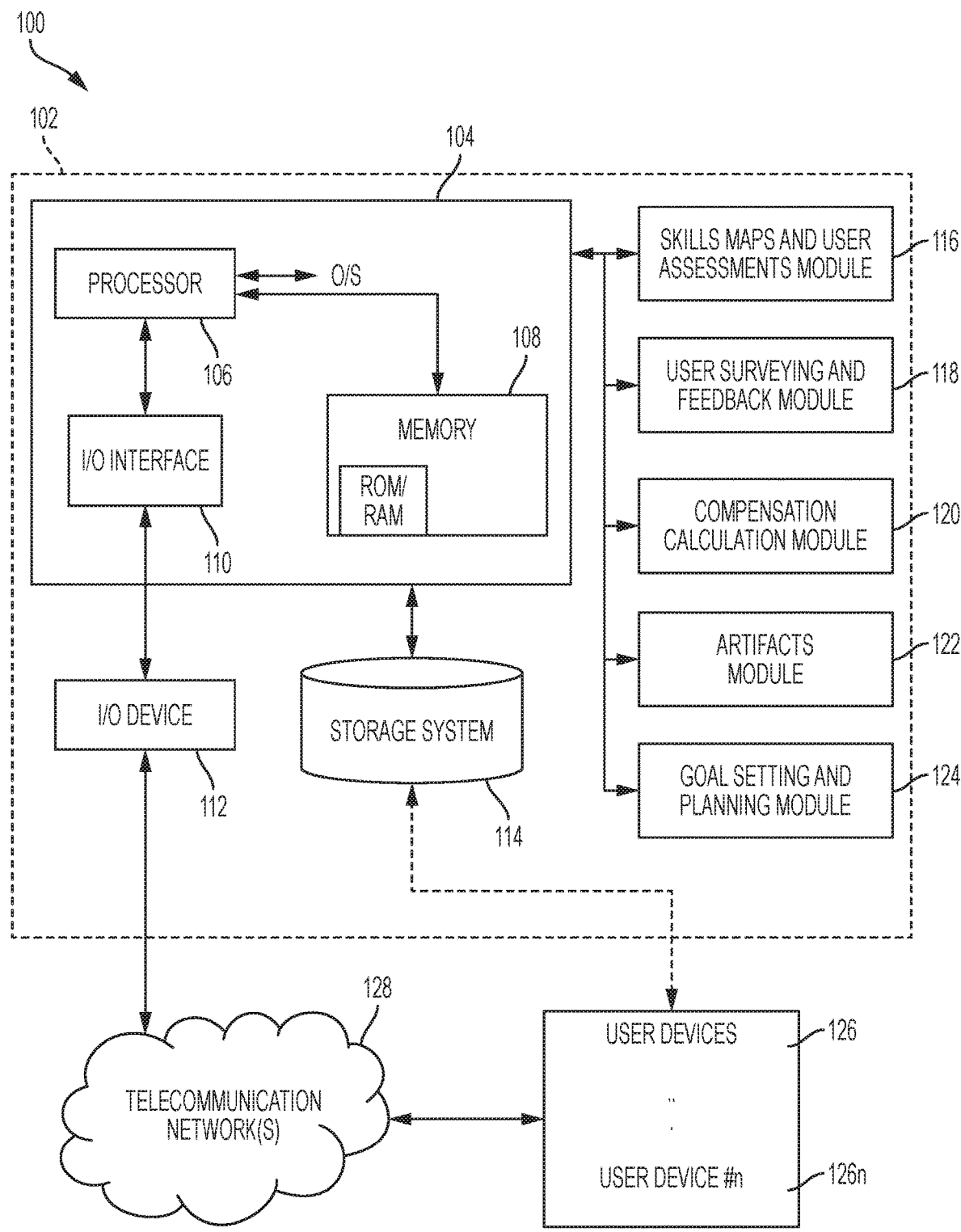
FIG. 1 is an illustrative environment for implementing the steps, in accordance with aspects of the present invention.

An illustrative embodiment of the present invention relates to a system and method for objectively, consistently, and efficiently assessing individuals' degree of learning or amplifying (i.e., teaching, building tools, and inventing) a set of skills relevant for their work within an organization, and across industries. Skills are presented by the present invention in a clear and structured way to facilitate the process of users assessing each other. The system and method of the present invention also capture and store skill stage endorsement, skill stage assessments, and historical assessments. The system and method capture current and all skill stages, skill stage endorsements, prior assessments for individual user review and organizational record keeping. In particular, skills for each individual within an organization are tracked in a skills framework or skills map associated with the individual. The system and method also provide users with dynamic information regarding each individual skill and each individual assessment level in order to ensure objectivity and accuracy of each assessment. When an endorser or other user is asked to assess an individual, they are presented with detailed information about the skills in the skill framework associated with the individual, as well as detailed information about each skill stage and skill weights for those skills. The system and method further provide the ability to onboard a new organization by allowing leaders to assess skill stages for all the skills for all individuals (e.g., employees, contractors, etc.) in a single activity.

Additionally, the system and method captures and stores artifacts of qualifications for performing the skill. In accordance with the present invention, artifacts are examples of an individual actually using or "doing" the skill in a workplace. The use of such artifacts increases an accuracy and objectivity of the system and help individuals who have not yet learned the skill to visualize what it takes to perform the skill. The system and method also enables an ability to survey any number of endorsers or other users, beyond an individual's manager, to accurately assess the stage of a skill that the individual has achieved or mastered. To determine a stage of skill for an individual, the system and method will identify other individuals who already practice the skill at a high level who have exposure to an individual being assessed or endorsed, survey those individuals to provide feedback, endorse, or assess the skill for the individual, and present skill and assessment information back to individuals and their leaders for the sake of ongoing coaching and skill development. The skill endorsement and assessment information provides individuals with targeted feedback in the form of written comments or in the form of specific skill stages within their skill map to develop. The system and method further provides a mechanism for individuals to set goals and create development plans to improve learning or amplifying against a user-selected set of skills as well as suggestions on how to accomplish those goals.

Moreover, the system and method enables computing target compensation for individuals correlated to the value the individual contributes to the organization based on the assessments provided by users against the comprehensive map of skills. Further, the system and method of the present invention provides models that enable individuals to identify characteristics that can be altered in a manner (i.e., indicating an adaptive development plan) dictating a desired career path and a predicted compensation range following future evaluations. The adaptive development plan can create, modify, and/or deviate from a strategic course of action to be carried out by the organization and/or individuals within the organization.

Initially, each individual within an organization is assigned a position within the organization, with each position including predetermined collections of skills associated therewith. This collection of skills becomes a skills framework or skills map for that individual. The predetermined collections of skills associated with the individuals are utilized by senior individuals and/or peers within the organization to endorse skills, skill stages, and evaluate the individuals. In particular, for each skill associated with an individual, an evaluating party will assign an objective skill stage indicating a stage of mastery or stage of skill that the individual has achieved with respect to that particular skill. The skills of the individuals are evaluated according to a scale of skill weights specifically matching the skills associated with each individual's position. In particular, based on the assigned skill stage for each skill and the skill weight assigned to each skill stage, a weighted average of the skills can be assigned to the individuals. The weighted average of the skill weights for each of the skill stages are utilized to calculate compensation. As a test to ensure that the values per skill stage have been assessed fairly and accurately, a calibration process comparing calculated compensation with existing marketplace compensation values for certain skills profiles takes place before the skills frameworks and goal setting modules are rolled out to be used by participants. Additionally, the system and method of the present invention can be used to set goals for the individuals and outline which skills need to be improved to meet such goals.

FIGS. 1 through 10, wherein like parts are designated by like reference numerals throughout, illustrate an example embodiment or embodiments of the evaluation system and method, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 depicts an illustrative system 100 for implementing the steps in accordance with the aspects of the invention. In particular, FIG. 1 depicts a system 100 including an analyzer system 102. In accordance with an example embodiment, the analyzer system 102 is a combination of hardware and software configured to carry out aspects of the present invention. In particular, the analyzer system 102 can be a computing system with specialized software and databases designed for providing an evaluation system or tool for performing an evaluation of skills for individuals. For example, the analyzer system 102 can be software installed on a computing device, a web based application accessible by computing devices (e.g., the computing device 104), a cloud based application accessible by computing devices, etc. The combination of hardware and software that make up the analyzer system 102 are specifically designed to provide a technical solution to a particular problem utilizing an unconventional combination of steps/operations to carry out aspects of the present invention. In particular, the analyzer system 102 is designed to execute a unique combination of steps to provide a novel approach to analyzing a career path and compensation of an individual based on their skills.

In accordance with an example embodiment of the present invention, the analyzer system 102 can include a computing device 104 having a processor 106, a memory 108, an input output interface 110, input and output devices 112 and a storage system 114. Additionally, the computing device 104 can include an operating system configured to carry out operations for the applications installed thereon. As would be appreciated by one skilled in the art, the computing device 104 can include a single computing device, a collection of computing devices in a network computing system, a cloud computing infrastructure, or a combination thereof. Similarly, as would be appreciated by one of skill in the art, the storage system 114 can include any combination of computing devices configured to store and organize a collection of data. For example, storage system 114 can be a local storage device on the computing device 104, a remote database facility, or a cloud computing storage environment. The storage system 114 can also include a database management system utilizing a given database model configured to interact with a user for analyzing the database data.

Continuing with FIG. 1, the analyzer system 102 can include a combination of core modules to carry out the various functions of the present invention. In accordance with an example embodiment of the present invention, the analyzer system 102 can include a skills map and user assessment module 116, a user surveying and feedback module 118, a compensation calculation module 120, an artifacts module 122, and a goal setting and planning module 124. As would be appreciated by one skilled in the art, the skills map and user assessment module 116, the user surveying and feedback module 118, the compensation calculation module 120, the artifacts module 122, and the goal setting and planning module 124 can include any combination of hardware and software configured to carry out the various aspects of the present invention. In particular, each of the skills map and user assessment module 116, the user surveying and feedback module 118, the compensation calculation module 120, the artifacts module 122, and the goal setting and planning module 124 are configured to provide users with an evaluation tool to evaluate individuals, provide goals for individuals, identify fair compensation for individuals, provide guidance to meet goals, identify gaps in a workforce for an organization, etc.

The skills map and user assessment module 116 is configured to provide a skills framework for mapping out sets of skills (e.g., skills maps) for positions and individuals occupying those positions within an organization. In particular, the skills map and user assessment module 116 is configured to store, organize, manage, and present the complete set of skills frameworks and individual skill stage assessments. The skills framework provides a shared library of skills across various work groups within an organization to be utilized by the skills map and user assessment module 116 in making skills maps for each individual within an organization. The skills maps can be further utilized by the system 100 to identify potential career paths, skills required for the potential career paths, and compensation for individuals within the organization based on a career path and/or collection of skills. Specifically, the skills framework enables individuals to review the sets of skills (e.g., a skills map) and evaluate an individual's proficiency or mastery in those skills (e.g., skill stage), identify potential career paths for individuals, identify the skills and/or skill stages needed to advance an individual's career path, calculate a compensation for a current position of an individual, calculate compensation for potential career paths for an individual, etc.

In accordance with an example embodiment of the present invention, skills, as discussed with respect to the present invention, are expressed as an action or verb that adds value to a position within an organization and indicates a function that an individual is accomplishing or performing with those skills. In particular, skills are values or verbs executed by an individual that are observable and/or quantifiable by another individual (e.g., a manager, supervisor, peer, etc.). These observable skills require some level of knowledge, experience, and/or motivation by the individual that can be quantified by another individual. In accordance with an example embodiment of the present invention, the skills are actions that are complex enough to be introduced to an individual in a day but not mastered by the individual. As an illustrative example, to master a skill, an individual will require an equivalent of a semester of collegiate studies, six months of full time studying, two years of active learning in the workforce, five years of passive learning in the workforce, etc. Additionally, the skill is able to be mastered in various extents (e.g., amplified) which can be quantified by an objective skill progression (e.g., a skill assessment progression). The skills also include a description and an example of what qualifies as performing or "Doing" the skill, which is included within the objective scale, as discussed in greater detail herein. The description and example provide an individual with enough information that users can set measurable learning and development goals for a collection of skills.

Using the system 100 provided by the present invention, individuals progress through skill development in stages rather than in linear levels. In a typical rating or Learning system, progression is linear, with each level of development representing a scalar improvement over the previous one. For example, in a system where an individual might be rated on a scale of 1 to 5 for a given skill, someone who is a 3 at a certain skill can be said to be 50% more proficient at that skill than someone who is a 2 at that skill. In the system of the present invention, however, each stage of development is qualitatively different from the others, and cannot be quantified in scalar terms of proficiency relative to any others. For example, the system of the present invention is not concerned with comparing the proficiency in a skill for one individual who is at "Learning" with another who is at "Doing". Even though Learning is the second stage in the system and Doing is the third stage, this doesn't necessarily mean that someone at Doing is 50% more proficient than someone at Learning. The meaningful difference, rather, is qualitative: the person at Learning is actively performing the skill but not Doing so entirely independently, whereas the person at Doing is performing the skill entirely independently. Characterizing skill development in this way allows organizations to more granularly understand their employees' skill development and to properly value each person's contribution to the firm based on how they qualitatively perform the skill. It also individuals to more thoroughly understand—and thus manage—their own development. Additionally, the system of the present invention is more concerned with assessing each individual's contribution and value to the organization rather than measuring their proficiency or development.

In accordance with an example embodiment of the present invention, the skills map and user assessment module 116 maintains a skill assessment progression and a skill framework for use in accordance with the present invention. The skill assessment progression provides a predefined progression for achieving different skill stages or levels of mastery of a skill for each skill included in the skills framework. In particular, utilization of the skill assessment progression in the analyzer system 102 enables a skill endorsement and performance review system that encourages adaptive behaviors, including for individuals to learn new skills and stages within those skills. The skill assessment progression enables such activity by providing a structured endorsement/evaluation system for observable behaviors of individuals rather than relying on subjective criteria on performance. The endorsement/evaluation system provided by the skill assessment progression is derived by identifying skills for an individual and a mastery of stages within those skills. In accordance with an example embodiment of the present invention, the term mastery level refers to the level at which an individual is practicing/executing a skill. The skill assessment progression identifies different levels of mastery for each skill in the skills framework relative to a predefined "doing" the skill. The predefined "doing" the skill acts as the mastery baseline for the skill progression with other skill stages being provided as some level of mastery from the "doing" baseline. The skill assessment progression can be utilized by users to identify what level of mastery individuals have achieved in particular skills which can be used for various evaluations in accordance with the present invention (e.g., identify which skills need further mastery for a particular career path). In accordance with an example embodiment of the present invention, the levels of mastery include main skill assessment progress stages with seven scale sub-categories for the main stages making up the skill assessment progression. The main skill assessment progression stages include not prioritized, learning, "doing", and mastering a skill. As would be appreciated by one skilled in the art, the skill assessment progression can be a non-linear progression of a skill such that each stage of a skill is not necessarily a linear progression of the previous skill stage. For example, an individual can progress from "Ready to teach" to "Inventing" without ever "Teaching", even though teaching is between "ready to teach" and "Inventing" in the skill assessment progression. These quantified skill stages do not represent levels of proficiency of an individual associated with a given skill; rather, they represent each stage's value to the organization in terms of how greatly it contributes to the overall performance of the organization.

The sub-category for the not prioritized stage of the skill assessment progression is the lowest end of the skill assessment progression (least advanced) and indicates that a particular individual is not actively learning the skill and that the skill may not be relevant to a current position within the organization. The sub-category for the learning stage is actively learning and is next in the skill assessment progression after not prioritized. The actively learning sub-category indicates that a particular individual is actively learning the skill (e.g., seeking apprenticeship, taking courses, researching best practice, training, etc.). In particular, the learning stage and sub-category represents a period of time in which an individual is transitioning from unaware of the skill to actively learning the skill.

The sub-categories for the "doing" stage are doing and ready to teach. The "doing" stage represents the period in time in which an individual is able to achieve mastery at the skill (e.g., doing the skill) and may become ready to teach the skill to other individuals In particular, the "doing" stage sub-category follows actively learning sub-category on the skill assessment progression and indicates that a particular individual is performing or "doing" a skill in a high quality way, as exemplified by examples of what performing a skill entails, as discussed in greater detail herein. In particular, the doing sub-category represents a mastery of a skill by an individual which is the baseline for all of the other sub-categories in the skill assessment progression. The stages preceding the "doing" stage indicate that an individual that has not yet mastered the skill, while the stage subsequent to the "doing" stage indicate that an individual has mastered the skill and is performing beyond mere mastery of a skill. The ready to teach sub-category is after the "doing" sub-category on the skill assessment progression and indicates that the individual has become an expert in performing or "doing" a particular skill.

The amplifying stage follows the "doing" stage and represents the period of time in which an individual is amplifying their knowledge and expertise in a skill through teaching others, building tools, and inventing. The amplifying stage includes teaching, tool building, and inventing scale sub-categories. The sub-category of teaching follows the ready to teach sub-category on the skill assessment progression and indicates that a particular individual is actively teaching the skill to other individuals at a level and breadth that creates substantial value for an organization. As would be appreciated by one skilled in the art, teaching can include coaching, training, capability building, suggesting a theory of impact behind why a skill is important, etc. The sub-category of tool building follows the teaching sub-category and indicates that a particular individual is building tools that allow multiple individuals within an organization to increase their productivity in a meaningful and measurable way (e.g., developing proprietary software). The sub-category of inventing is the end of the skill assessment progression (most advanced) and indicates that a particular individual is inventing new knowledge analogous to creating a new line of business of way of conducting business within a field. FIG. 2 depicts an illustrative example of the skill assessment progression 200 in tabular format. In particular, FIG. 2 depicts a tabular format of the skill assessment progression 200 including the main stages and sub-categories as discussed herein. As would be appreciated by one skilled in the art, the skill assessment progression can be stored in any number of formats known in the art (e.g., database entries) and each of the stages and sub-categories of the skill assessment progression can be modified in both quantity and characterization while still operating in accordance with the present invention.

In accordance with an example embodiment of the present invention, each of the sub-categories provides a binary (e.g., yes or no) entry for observable behaviors into the skill assessment progression during evaluation of an individual. Accordingly, the utilization of the binary sub-categories in the skill assessment progression provides a rating system that reduces or eliminates subjectivity of assessments of individuals. As a result, the skill assessment progression provides organizations with an objective rating system which encourages organizations to shift evaluations to focus on learning and amplifying skills of individuals within the organization. For example, during an evaluation utilizing the skill assessment progression, leaders of an operations team can identify that they are spending too much time building tools and little time teaching others, and adjust their priorities accordingly. Implementation of the skill assessment progression and the provided results are discussed in greater detail herein.

In accordance with an example embodiment of the present invention, the skills map and user assessment module 116 manages quantifiable skill weights for each of the sub-categories in the skill assessment progression. In particular, the skills map and user assessment module 116 provides a quantifiable scale for each of the different levels of "doing" a skill and in turn provides quantifiable skill weight for each skill stage of the sub-categories (e.g., not prioritized, actively learning, ready to teach, teaching, tool building, inventing). The skill weight represents a quantifiable value that the particular skill has to the organization, with the higher the weight being more valuable skills or skill stages. The skill weight are utilized by other modules in the analyzer system 102 to execute various functionalities (e.g., calculating compensation), as discussed in greater detail herein. The "doing" sub-category provides the baseline value for each of the sub-categories in the skill assessment progression and each of the values for the sub-categories is derived from the "doing" baseline and the sub-categories are assigned skill weights based on how they relate to "doing". In particular, the skills map and user assessment module 116 maintains a ratio of mastery for each of the sub-categories in the skill assessment progression and bases the respective skill weight for the sub-categories based on the ratio of mastery. Utilizing the ratio of mastery for each sub-category, the skills map and user assessment module 116 can derive a skill weight for each sub-category. For example, TABLE 1, as depicted below, provides an example of ratio of mastery for the sub-categories and the resulting skill weight associated with each of the sub-categories based on the ratio of mastery (note, these values are merely illustrative and not limiting of the invention).

TABLE 1

| Sub-Category | Skill Weight | Ratio of Mastery |
| --- | --- | --- |
| Not applicable or not prioritized | 0 | 0 |
| Actively learning | 1 | 0.2 |
| Doing with mastery | 5 | 1 |
| Ready to teach | 8 | 1.6 |
| Teaching | 15 | 3 |
| Tool/process building | 30 | 6 |
| Inventing | 80 | 16 |

As depicted in TABLE 1, the doing mastery has a skill weight of 5 and each of the other sub-categories skill weight are calculated based on the predetermined ratio of mastery values. For example, actively learning has a ratio of 0.2 to doing and thus 0.2×5=1 with 1 being the assigned skill weight for actively doing. As would be appreciated by one skilled in the art, the ratio of mastery numbers and the baseline skill weight for "doing" can be modified to include any values and are not limited by the exemplary values provided in TABLE 1 or any other example discussed herein. The resulting skill weight can be utilized in various algorithms for computations performed by the system 100 (e.g., compensation calculations). In accordance with an example embodiment of the present invention, the ratios represent the relative value creation as related to the skill. For example, if a representative value for doing a skill is two, the representative value for teaching would be six (e.g., with ratio of mastery between doing and teaching being three). Therefore, based on the respective values each skill stage, it can be determined that for an individual to achieve the skill stage of a teaching level, that individual should be demonstrating a capability of three times the representative value of doing that skill.

In accordance with an example embodiment of the present invention, skills map and user assessment module 116 is responsible for maintaining and updating the skill values for each skill within the skills framework. In particular, the skills in the skills framework can be weighted based on a perceived skill value assigned to each respective skill in the skills framework. The skill values can include any classification that can be utilized to rank a level of importance of a skill. For example, the skill values can be low, medium, high, and very high. Additionally, each skill value is associated with a weighted skill value multiplier, with each increase in skill value having an increased weighting. The skill value can be assigned a skill value multiplier or weighting based on the level of skill value. For example, TABLE 2, as depicted below, provides an example of skill values and skill value multipliers associated with the skill values (note, these values are merely illustrative and not limiting of the invention).

TABLE 2

| Skill Value | Skill Value Multiplier |
| --- | --- |
| Very high | 8 |
| High | 4 |
| Medium | 2 |
| Low | 1 |

As depicted in TABLE 2, the skill values are ranked from very high to low, and the associated skill value multipliers are weighted with very high having the highest weighting and decreasing to the lowest weighting for the skill value of low. As would be appreciated by one skilled in the art, the skill values and/or skill value multipliers can be modified to include different terminology and values and are not limited by the exemplary values provided in TABLE 2 or any other example discussed herein. Additionally, as would be appreciated by one skilled in the art, the skill values and/or the associated weightings (e.g., skill value multipliers) can be predetermined values associated with the skills at the time of creation of the skill, can be assigned by users within an organization during an initial configuration, and/or can be modified at a later point in time. For example, multiple users within an organization can determine how important, relatively, each skill is as compared to other skills and rate the skills on the scale from "low" to "very high".

In accordance with an example embodiment of the present invention, in the instances when more than one user (e.g., multiple key decision makers providing input to the system 100 during calibration of the skills maps (during an initial setup or recalibration)) is assigning skill values to skills, the skills map and user assessment module 116 can perform an averaging function to calculate a single average skill value for each skill in the skills framework. In particular, the skills map and user assessment module 116 can perform a summing operation of all the skill value multipliers (one for each user skill value rating) for each individual skill in the skills framework and divide the sum by the number of user skill value ratings. For example, if three users rated a particular skill with skill values of high, medium, and high, then the skills map and user assessment module 116 looks up the skill value multipliers for those ratings (e.g., 4, 2, 4, respectively), sums the three skill value multipliers (e.g., 4+2+4=10), and divides by three to get the average skill value multiplier for that particular skill (e.g., 10/3=3.3333). As would be appreciated by one skilled in the art, this averaging operation or any other known averaging operation one can be performed for each individual skill in the skill framework.

In accordance with an example embodiment of the present invention, the average skill values can be calculated during an initial setup of the skills within a skills framework of an organization. For example, administrators of the analyzer system 102 will populate the skills and their respective skill stages, skill values, and other descriptors, during an initial setup of the system. Once the skills and skill stages are populated, the skills map and user assessment module 116 can perform the averaging function if necessary to determine the final skill value. As would be appreciated by one skilled in the art, new skills can be added with average skill stages updated at the time of addition and skill stages and associated skill values can be re-evaluated, updated, and re-averaged at any point in time.

In accordance with an example embodiment of the present invention, the skills, skill stages, skill assessment progression, skill values, etc., and the content associated therewith, can be created, modified, deleted, and defined by one or more individuals (e.g., administrators) within an organization. In particular, each of the descriptors and characteristics provided in the skills framework can be provided by the organization. For example, initial setup of the analyzer system 102 can include prompting the organization to populate the skills framework and provide any definitions, examples, skill stages, etc. for all of the skills in the framework. As would be appreciated by one skilled in the art, the organization can be provided with a default skills framework to build their customized skills framework from. Similarly, the skills can be added and modified at any point in time and updated in the skills framework for use during evaluation, such that each organization can include its own predefined collection of skills customized to match positions within an organization and the workforce employed by the organization.

Additionally, the skills and associated descriptive elements can be created, modified, deleted, and defined based on crowdsourced feedback provided to the skills map and user assessment module 116 by a plurality of organizations. As would be appreciated by one skilled in the art, the skills can be created, modified, deleted, and defined using any system or method known in the art. For example, the skills and the information associated therewith (e.g., skill stages, skill values, descriptions, examples, etc.) can be created, modified, deleted, and defined in a database and accessed utilizing a graphical user interface accessing the database. Additionally, the skills can be created, modified, deleted, and/or defined from a base set of predefined skills provide by the skills map and user assessment module 116. Once skills are created, modified, deleted, and/or defined by an organization, the skills map and user assessment module 116 can update the skills framework for the organization (e.g., within the storage system 114) to reflect the changes and for use by the skills map and user assessment module 116.

In accordance with an example embodiment of the present invention, the skills framework includes a library or catalog of all of the skills provided by the skills map and user assessment module 116 and the system 100. In particular, the skills framework provides curricula of skills that individuals within an organization can develop over the course of a career. The skills curricula define a set of tasks or programs that a user could accomplish in order to progress to a given skill stage within a skill. Additionally, each position within an organization can include its own predefined collection of skills or skills maps within the skills framework. Each collection of skills can include categories of skills depending on the nature of work required within the position. Similarly, each individual within an organization can have a predefined collection of skills or skills map associated with them, based on experience, their position, work history, etc.

In accordance with an example embodiment of the present invention, the skills framework can include main categories of skills in which all of the skills within the skills framework are organized. In particular, the skills in the skills framework can be mapped and/or subdivided into logical categories that are associated by the main categories of skills. The main categories provide users with a simplistic manner to navigate and organize the skills within the skills framework. For example, the main skill categories can include foundational skills, specialized skills, and role/function-specific skills. As would be appreciated by one skilled in the art, there can be any quantity, curricula, and vocabulary that can be used for the main categories without departing from the functionality provided to the present invention.

Figure 3:
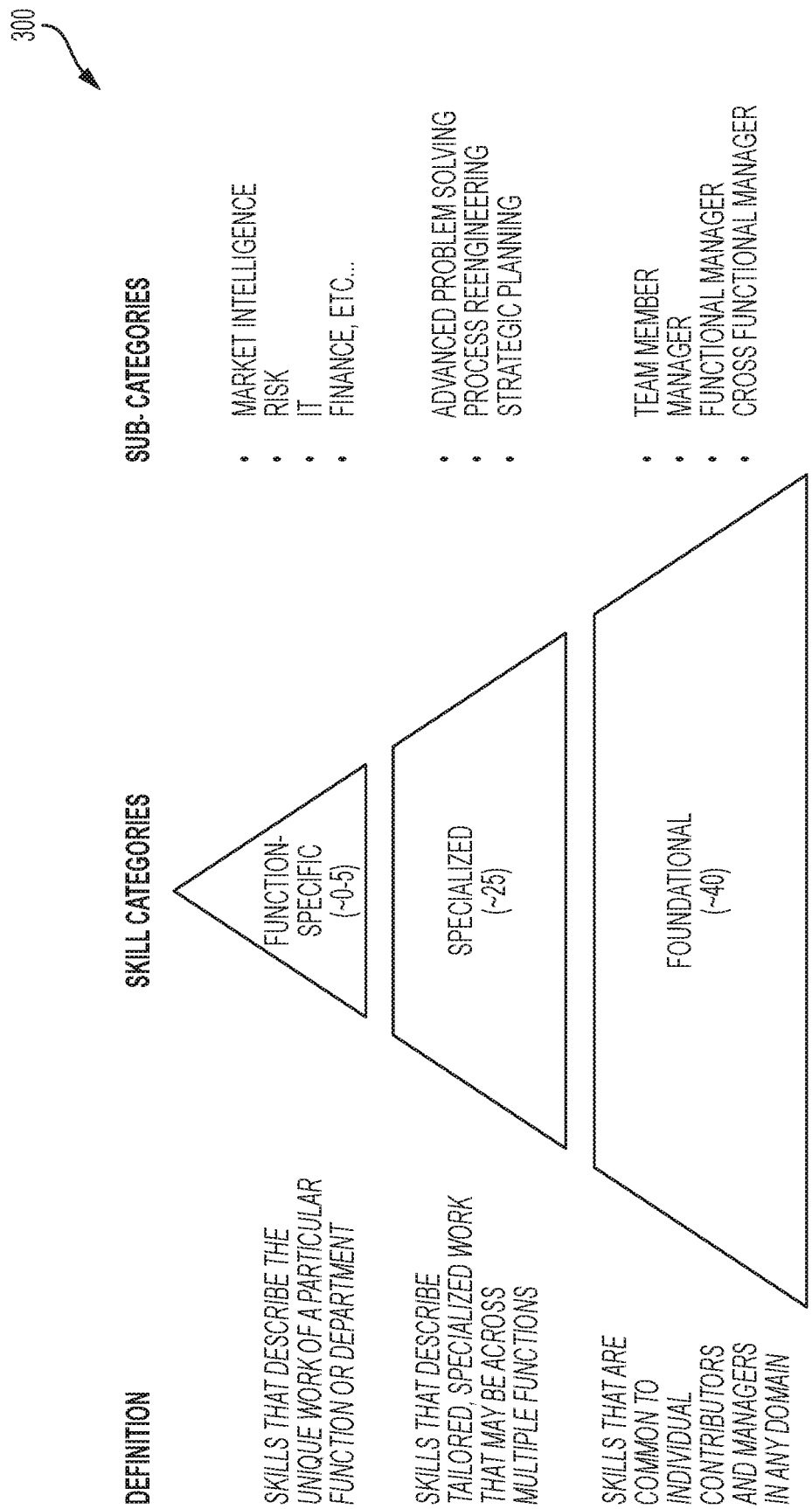
FIG. 3 is an exemplary breakdown of skills in a skills framework, in accordance with aspects of the present invention.

Continuing the example, the foundational skills can include skills that are common to individual contributors, leaders, and managers in any domain or workgroup. The foundational skills can include a majority of the skills in the skills framework and provide the base of the skill category hierarchy. The specialized skills can include skills that describe tailored, specialized work that may overlap across multiple functions. The specialized skills can include the next largest collection of skills in the skill category hierarchy. The function-specific skills can include skills that describe the unique work of a particular function of a department (e.g., finance, engineering, etc.). The function-specific skills can include about ten percent of the skills in the skills framework. Additionally, each of the main skill categories can further include sub-categories of skills associated with the main skill. For example, sub-categories for foundation skills can include skills related to team member, manager, functional manager, cross functional manager, etc. Sub-categories for specialized skills can include skills related to advanced problem solving, process re-engineering, strategic planning, etc. Sub-categories for function-specific skills can include skills related to market intelligence, risk, information technology (IT), finance, etc. FIG. 3 depicts an example hierarchical breakdown 300 of potential main categories for skills in a skills framework. In particular, FIG. 3 depicts an exemplary skills framework tailored to the examples provided herein.

In accordance with an example embodiment of the present invention, each predefined collection of skills associated with each position within an organization can include its own predefined collection of skill sub-categories of skills and/or skills framework. For example, a manager may have a particular collection of skills that are separate and distinct from the collection of skills for an engineer within the same organization. The collection of skills for each position, workgroup, and/or individual can include a similar hierarchical breakdown 300 of main categories and skills as provided in FIG. 3. As would be appreciated by one skilled in the art, the collection of skills for each position can include an overlap of individual skills and sub-categories of skills.

In accordance with an example embodiment of the present invention, the skills map and user assessment module 116 manages and maintains the descriptions and examples of what qualifies as performing or "doing" a skill stored in the skills framework. The description for a skill provides a brief summary or definition of what the skill represents and what qualifies as mastering a skill. In accordance with an example embodiment of the present invention, the skill descriptions and examples are provided to the skills map and user assessment module 116 by an administrative user during an initial setup of the analyzer system 102 and updated accordingly thereafter. The skills should be described in a consistent manner throughout the organization to increase the effectiveness of the skill assessment progression and the functionalities of the modules 116, 118, 120, 122, 124 of the present invention. The skills can be customized by the organization to include all skills that are directly linked to the behaviors and activities that create value for the organization. Example criteria for identifying a skill include but are not limited to something that can be introduced in a daylong course (e.g., finance modeling), something that takes at least 1 year to get to "doing", something that enables learning goals that require an individual to seek coaching and create a plan to develop a skill, and a way to amplify a skill at each level in the skill assessment progression (e.g., teaching, building tools, inventing, etc.).

Similarly, the examples convey to the user what defines an individual performing or "doing" a skill. The more specific and concrete the definition or required characteristics in the example, the more objective and fair the skills framework will be for the user. For example, an example for a skill of "manage and optimize time" will have a description of "uses a system to manage time productively, prevents tasks from falling through the cracks, allows for flexibility when needed, and ensures the on-time delivery of work". The example of performing or "doing" the skill of "manage and optimize time" is "prioritizes disputes, depending on location, materially, age, and rationale, as well as prioritizes tasks depending on the audience and knowing what needs to be done and what is nice to have. Provides realistic deadlines to key stake holders, manages expectations, and updates timelines with management".

Additionally, when possible, the examples will refer to specific documents or models and tasks associated therewith. An example of performing or "doing" the skill of "communicate visually" might be a series of PowerPoint slides with call-outs showing key characteristics that would suggest the person who created this is at the stage of "doing." In accordance with an example embodiment of the present invention, users can upload the documents or models to the analyzer system 102 via the artifacts module 122. Otherwise, the examples should describe the scenarios in which these skills would become evident. As would be appreciated by one skilled in the art, the description and examples for skills can be customized to fit particular positions within an organization utilizing any operable system or method known in the art. For example, description and examples for skills can be created, modified, deleted, and defined in a database and accessed utilizing a graphical user interface accessing the database. Additionally, description and examples for skills can be created, modified, deleted, and/or defined from a base set of predefined skills provide by the skills map and user assessment module 116. Once skills are created, modified, deleted, and/or defined by an organization, the skills map and user assessment module 116 can update the skills framework for the organization (e.g., within the storage system 114).

In accordance with an example embodiment of the present invention, the skills map and user assessment module 116 further provides a skills framework for ensuring completeness and an appropriate level of granularity of the skills maps. For example, the skills map and user assessment module 116 can provide a skills framework for including skills from each stage in a learning cycle of performance cycle. The example of the performance cycle provides a context in which to include skills of learning within the skills framework or skills map, rather than limiting the framework only to skills of executing work.

Figure 4:
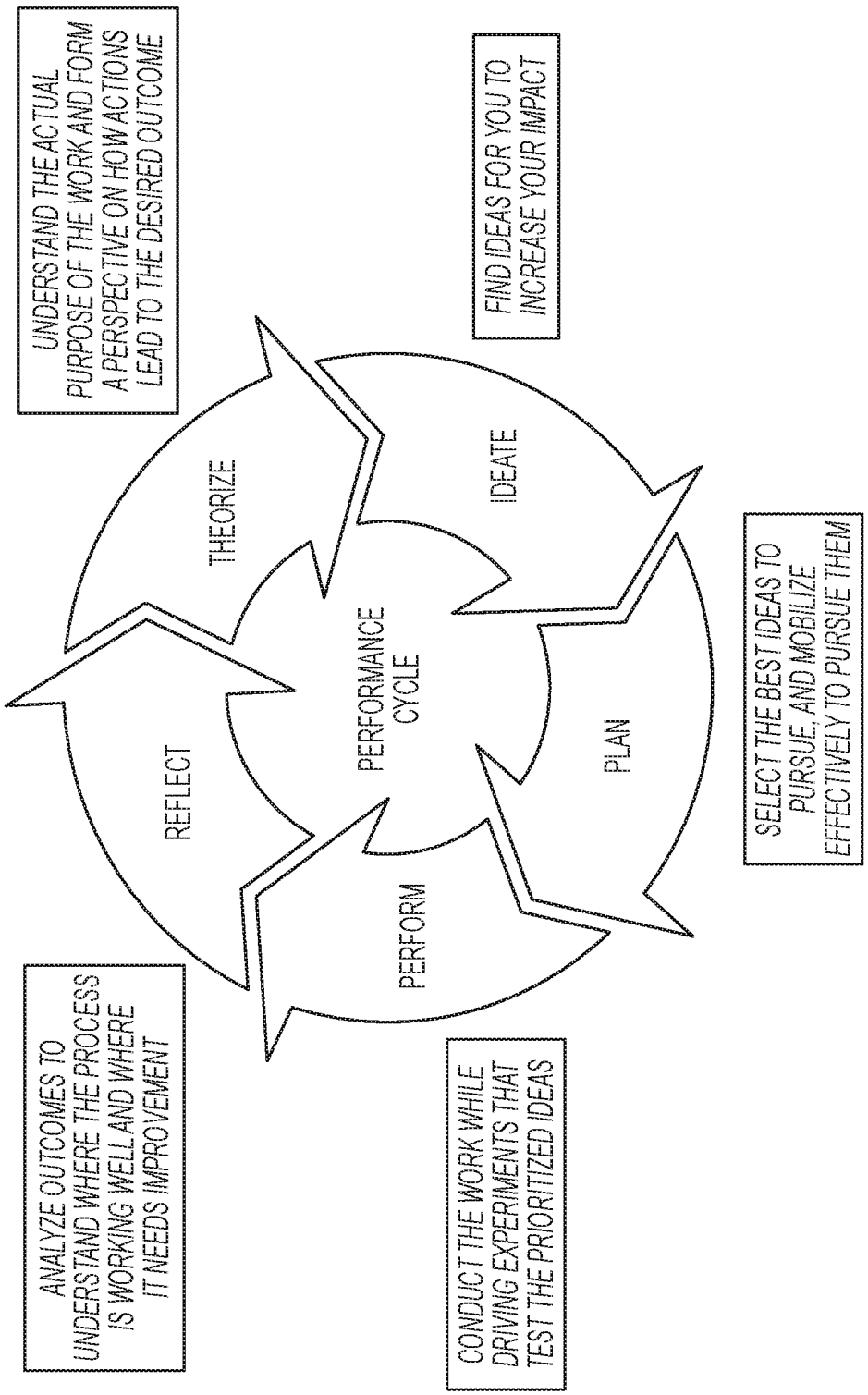
FIG. 4 is an exemplary performance cycle, in accordance with aspects of the present invention.

FIG. 4 depicts an example performance cycle 400 and the steps included therein. In particular, FIG. 4 depicts a performance cycle 400 including steps starting with theorize, ideate, plan, perform, and reflect. Each step of the performance cycle represents a stage of "doing" a task or job function. The theorize stage of the performance cycle 400 represents a stage when an individual understands the actual purpose of the task or job function and can form a perspective on how actions lead to the desired outcome (e.g., Stage of the performance cycle where one finds ideas for you to increase your impact the task or job function). The ideate stage of the performance cycle 400 represents the stage when an individual finds ideas for how to increase an impact when "doing" a task or job function. The plan stage of the performance cycle 400 represents the stage when an individual selects the best ideas to pursue, and mobilize effectively to pursue "doing" the task or job function. The perform stage of the performance cycle 400 represents the stage when an individual actually conducts "doing" the task or job function while driving experiments that test the prioritized ideas. The reflect stage of the performance cycle 400 represents the stage than an individual analyzes outcomes to understand where the process of "doing" the task or job function is working well and where it needs improvement. Each of the stages in the performance cycle 400 and the skills associated therewith provide a mechanism, path-way, and process for continuous improvement of individual skills and career goals. By walking through the performance cycle when refining skills, an individual and an organization can ensure that they capture skills across the cycle. As would be appreciated by one skilled in the art, the skills framework can be presented in a variety of ways to ensure proper coverage of skills in the framework or skills map. For example, a leadership hierarchy framework including a team member (e.g., individuals within the organization), a team leader (e.g., a coach, supervisor, manager, etc.), a functional leader, and cross-functional leader is another example of a framework used to tag skills to ensure completeness. In other words, for each stage of the performance cycle, a user can consider what types of skills are necessary and then make sure those types of skills are in the skills framework.

In accordance with an example embodiment of the present invention, the skills map and user assessment module 116 provides categorization for the stages in the skills framework (e.g., the stages of the performance cycle 400). The categorization of the stages and the other descriptive elements (e.g., name, description, examples, etc.) of the skills enables users to fully understand what is meant by "doing" a skill and at what level to indicate an individual's mastery during evaluation. In particular, with all the descriptive elements included within the skills framework, a user can be as objective as possible when endorsing and/or evaluating skills and skill stages of an individual. Additionally, as would be appreciated by one skilled in the art, the skills framework can have other descriptive elements for each of the skills for utilization by users. For example, cycle number, cycle name, cycle stage, category, sub-category, etc.

Figure 5A:
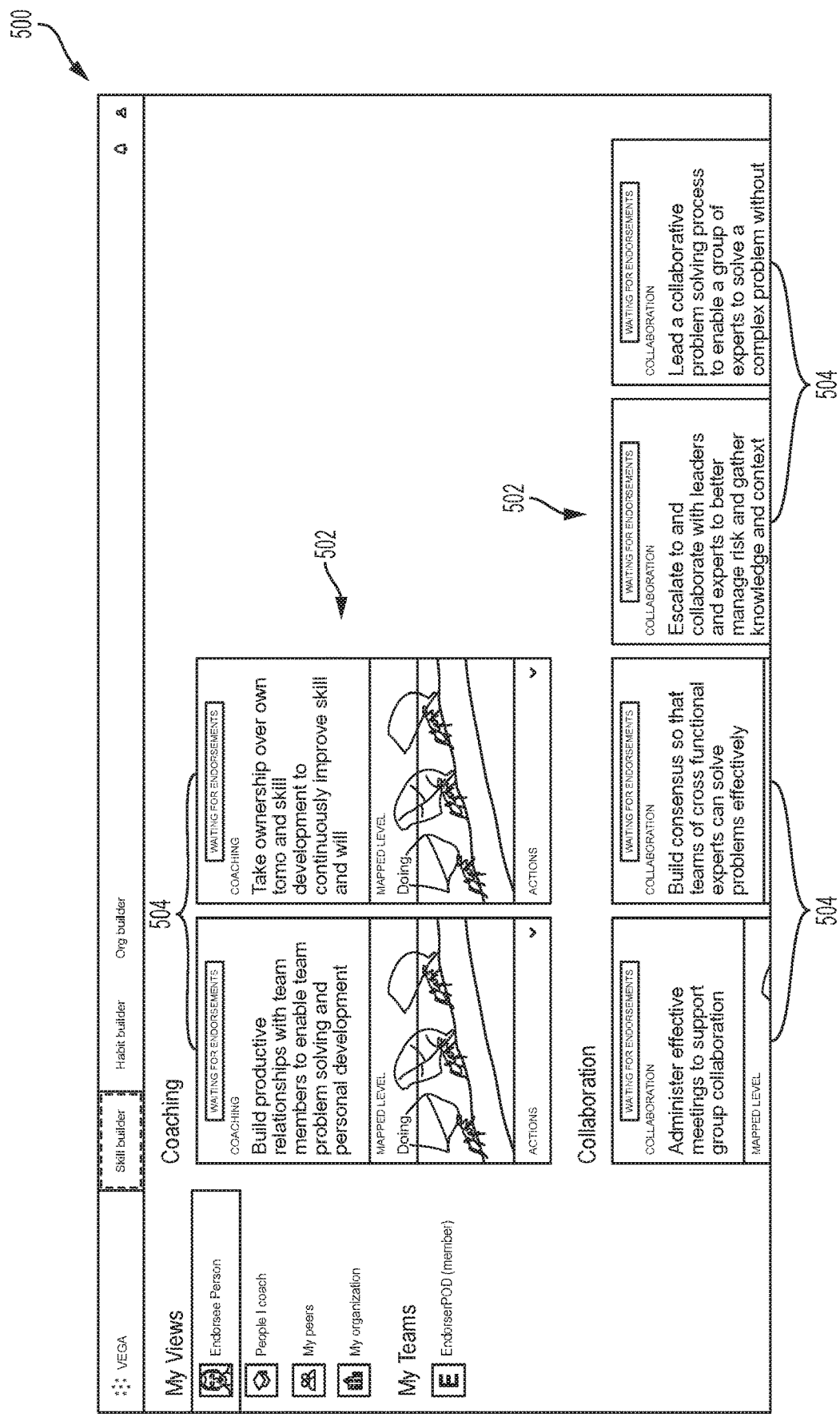
Figure 5B:
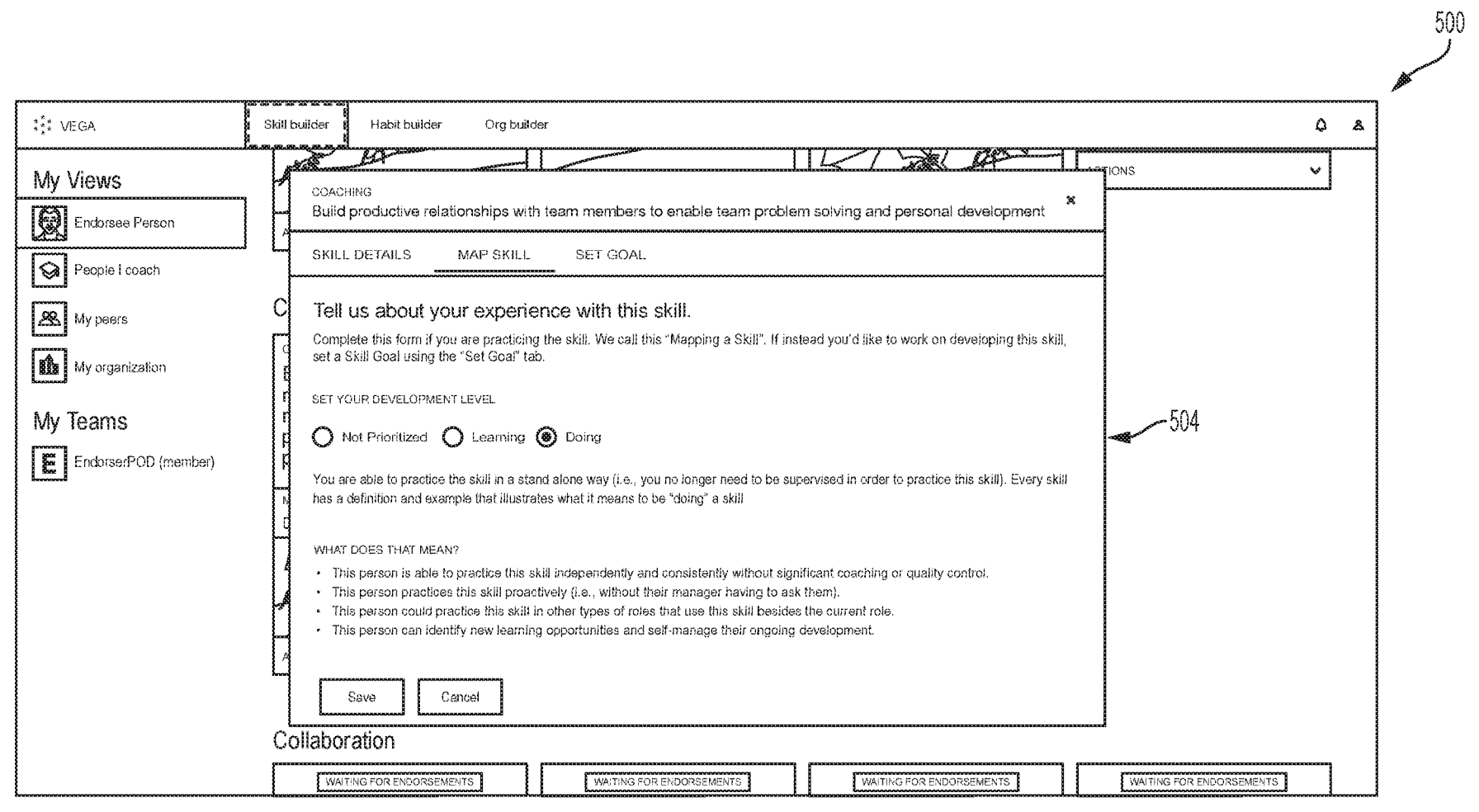

Additionally, the skills map and user assessment module 116 is configured to generate a graphical user interface 500 to convey and receive data related to an individual, skill maps (or skillsets) associated with the individual or position, provide descriptive elements about the skills, and convey career oriented information to the individual based on that data. FIGS. 5A and 5B depicts an example card-based view of an excerpt from a skills framework. In particular, FIGS. 5A and 5B depict an example graphical user interface 500 conveying a card-based view 500 providing information relating to a skills map of an individual. The graphical user interface, as depicted in FIG. 5A, depicts groups of cards configured in descriptive bundles 502. Examples of the descriptive bundles include coaching, collaboration, etc. Each skill is represented by a card 504 within the bundles 502. The cards 504 include information about the skill and how that skill relates to the individual. For example, the cards 504 can include the skill, the skill sub-category, the mapped stage of the skill, a list of actions to take regarding the skill, etc.

In operation, the user can utilize the card-based view of the graphical user interface 500 select a skill card 504 to pull up the description of the skill, examples of the skill, the stages of the kill, etc. FIG. 5B depicts an example detailed view of a skill card 504 after a user selection. The skill card 504 in FIG. 5B depicts the options to view skill details, map the skill, and set a skill goal. Under the map skill selection of the card 504, as depicted in FIG. 5B, there are additional details related to the skills map, and a user can select a skill stage for that skill, such as not prioritized, learning, or doing. The skill details section of the card 504 (not depicted) includes information related to the skill including examples, artifacts, curricula, etc. The set goal section of the card 504 includes an option to set a goal related to the skill (e.g., a "goal" means a statement of intent to reach a specific stage of skill development). As would be appreciated by one skilled in the art, the skill card 504 can include any combination of information related to the skills without departing from the scope of the present invention. For example, the skill card 504 can include a conversations section to show conversations between users about the skill or an activity section to show recent activities related to the skill. The skills map and user assessment module 116 maintains the skill bundles 502, skills cards 504, and skill maps, which can be utilized by individuals to carry out the various aspects in accordance with the present invention (e.g., endorsement/ evaluation of individuals and career paths).

Figure 5C:
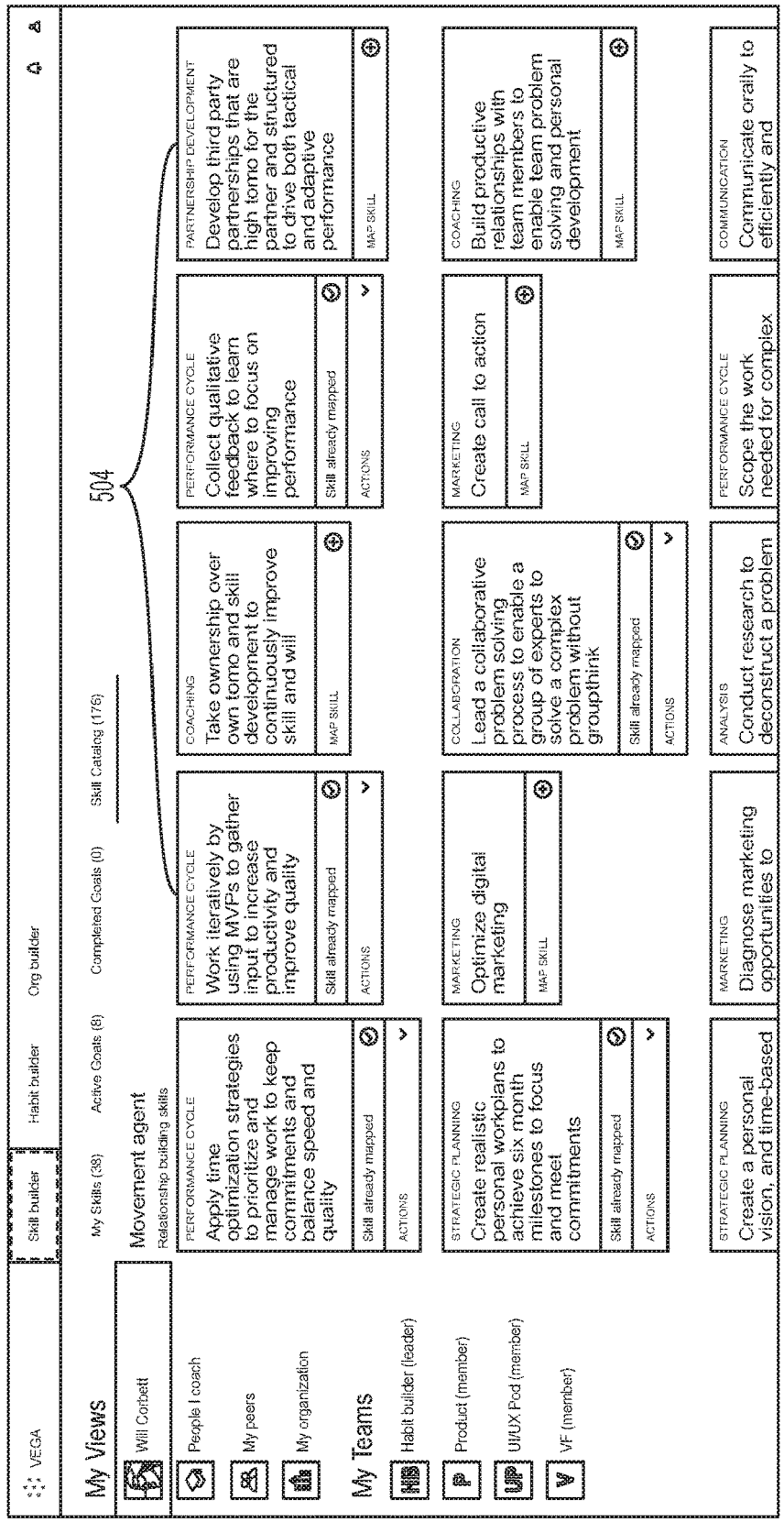

In addition to the skills map, the skills map and user assessment module 116 provides a skills catalogue that contains all of the skills in the system 102. The system 102 can convey the information from the skills catalogue in the graphical user interface 500, as depicted in FIG. 5C. Individuals can access the skills catalogue to add skills from the skills catalogue to their skills map at any point following the initial generation of their skills map, including during the initial skill claim period, as discussed in greater detail with respect to FIG. 6. The user can then interact with these skills in the same way that they would any of the skills on their initial skills map, triggering the ensuring workflows, processes, and capabilities (e.g., skill claims, endorsement, goals, compensation algorithm, etc.). Additionally, the user can optionally be given the ability to remove skills from their skills map that they do not wish to map. These skills would then be accessible again via the skill catalogue.

Furthermore, the skills map and user assessment module 116 can provide a specific set of generalized skills that are used as the foundational set of skills to be mapped and used for the processes described herein for a generic organization. Specifically, these include role bundles of skills maps for the roles and departments that generally exist within most organizations, including, but not limited to, human resources, operations, risk management, finance, frontline sales, customer service, consulting, software engineering, sales, marketing, etc. For example, one role bundle might be a collection of skills for a Product Manager. Any user determined in the system to be a Product Manager, whether by self-selection upon registration or by some other mechanism, would be provided with a skills map pre-populated by all of the skills belonging to the Product Manager role bundle. The bundle would include the skills designated to be relevant to the Product Manager role, whether by members of the organization or some other person, group of people, and/or mechanism.

In accordance with an example embodiment of the present invention, in operation, the skills map and user assessment module 116 can execute a variety of other functions for the analyzer system 102. In particular, the skills map and user assessment module 116 can assess a degree of learning or amplifying (i.e., teaching, building tools, and inventing) on a set of skills for individuals relevant to their work within an organization and across industries. In doing so, skills are presented in a clear and structured way to facilitate the process of users endorsing/assessing each other. The skills map and user assessment module 116 can further be configured to capture and store skill-level evaluations and historical evaluations that have been performed by users. As would be appreciated by one skilled in the art, the saved historical evaluations can be accessed by users for a variety of purposes (e.g., to note improvement of an individual's skills) or to be utilized to perform analytics.

The user surveying and feedback module 118 is configured to gather 360-degree feedback on skill stages for individuals or developmental comments provided to the analyzer system 102. In particular, the user surveying and feedback module 118 is configured to enable user endorsement and/or evaluation of skills of an individual, as discussed with respect to FIGS. 6 and 7. In accordance with an example embodiment of the present invention, the surveying and feedback module 118 identifies individuals that are highly skilled and fall within a particular individual's proximity (e.g., relationship within the organization and/or skill collection) such that the individual can determine a skill stage for that particular individual. For example, the surveying and feedback module 118 can search the skills framework to identify individuals matching particular collection of skills to the particular individual to be evaluated (not necessarily a manager or supervisor of the particular individual). As would be appreciated by one skilled in the art, the surveying and feedback module 118 can identify a plurality of different analyzers for different subsets of skills for the particular individual (in situations where no one individual matches all of the skills of the particular individual), such that each skill being endorsed/evaluated is being endorsed/evaluated by an individual sharing a higher level of mastery in that skill, or who is otherwise qualified to evaluate the individual for that skill. Additionally, the surveying and feedback module 118 is configured to provide organizational leaders an opportunity to validate endorsements/evaluations performed on individuals. For example, once an evaluation of an individual has been performed and saved by the skills maps and user assessment module 116, the surveying and feedback module 118 can provide the results to the leader or superior responsible for the endorsed/ evaluated individual for validation. The surveying and feedback module 118 can be further configured to enable users to provide quantitative feedback in addition to the skill endorsements/evaluations. For example, the surveying and feedback module 118 can provide users an ability to provide targeted feedback between individuals in the form of written comments, the identification of key skills to develop, etc.

The compensation calculation module 120 is configured to convert skill frameworks or skill maps assessments for individuals, provided by the skills maps and user assessment module 116 and/or the surveying and feedback module 118, into a compensation number. In particular, the compensation calculation module 120 computes target compensation based on the assessments provided by users for an individual against a comprehensive map of skills, as discussed in greater detail with respect to FIG. 8. In other words, compensation calculation module 120 calculates compensate for individuals based on their level of skill amplification by assigning a value to each skill, as well as each level of amplification.

The artifacts module 122 is configured to upload, save, validate, and present the artifacts for performing a skill or stage of a skill. As would be appreciated by one skilled in the art, the artifacts can be uploaded and saved to the analyzer system 102 utilizing any combination of methodologies and systems known in the art. The artifacts are the examples of an individual actually using the skill in the organization. The utilization of the examples provided by uploaded artifacts increases the accuracy of the analyzer system 102 and the functionality provided by the other modules. For example, the examples provide users with information for making more consistent evaluations via the skills maps and user assessment module 116. In accordance with an example embodiment of the present invention, only individuals within an organization that have achieved a level of mastery or "doing" a skill can upload the artifacts. Additionally, the artifacts module 122 can be accessed by users to review or rate the quality of the uploaded artifacts.

The goal setting and planning module 124 is configured to set skill developmental goals and create developmental plans based on those goals for an individual (e.g., career development). In particular, the goal setting and planning module 124 is configured to enable users to set goals and create development plans for individuals to improve learning and amplifying against a selected set of skills for the individual. The goal setting and planning module 124 enables users to set their own skill goals, ask for feedback on their goals, state when their goals are complete, and provide other individuals with ideas/coaching on which goals to set. Additionally, the goal setting and planning module 124 is configured to provide automation of endorsements, advice from endorsers and other users, provide curriculum support, and add feedback through a comments system for discourse attached to skills and goals. In accordance with an example embodiment of the present invention, the goal setting and planning module 124 provides users with sets of goals in the form of a career development plan. As would be appreciated by one skilled in the art, the sets of goals and/or the career development plan can be presented to the user utilizing any methodology and systems known in the art. For example, a computing device (e.g., user device 126) can generate a graphical user interface to display the goals within their skills map.

In accordance with an example embodiment of the present invention, the system 100 can include a plurality of user devices 126 configured to communicate with the analyzer system 102 over a telecommunication network(s) 128. The analyzer system 102 can act as a centralized host providing the functionality of the modules 116, 118, 120, 122, 124 sharing a secured network connection. As would be appreciated by one skilled in the art, the plurality of user devices 126 can include any combination of computing devices, as described with respect to the analyzer system 102 computing device 104. For example, the computing device 104 and the plurality of user devices 126 can include any combination of servers, personal computers, laptops, tablets, smartphones, etc. In accordance with an example embodiment of the present invention, the computing devices 104, 126 can be configured to establish a connection and communicate over telecommunication network(s) 128 to carry out aspects of the present invention. As would be appreciated by one skilled in the art, the telecommunication network(s) 128 can include any combination of known networks. For example, the telecommunication network(s) 128 may be combination of a mobile network, WAN, LAN, or other type of network. The telecommunication network(s) 128 can be used to exchange data between the computing devices 104, 126, exchange data with the storage system 114, and/or to collect data from additional sources.

In operation, the system 100 provides a graphical user interface (GUI) to carry out the various aspects of the present invention (e.g., GUI 500). In particular, the computing device 104 generates a GUI providing a skills framework for individual employees throughout a company to be utilized for evaluations and career path planning. As would be appreciated by one skilled in the art, the GUI can be generated utilized any combination of software and hardware known in the art (e.g., via the skills map and user assessment module 116). A skills map for a particular individual can be provided by the GUI to be populated by a user. The user can include any individual within an organization responsible for endorsing/evaluating another individual (e.g., a manager, peer advisor, etc.) or an individual performing a self-evaluation.

The system 102 (combination of modules 116, 118, 120, 122, 124) utilizing the skills framework and the skill assessment progression provides individuals insight into their current skill stages, career progression (e.g., evaluation), and potential career paths, and the skills and skill stages required to meet that progression. Overall, the system 102 provides a mechanism to convey a combination of data analytics, based on the information stored in the skills framework and the evaluation of those skills, in displayable formats easily understood by users. The information is custom tailored to each individual based on how the individual has been evaluated. The skills evaluation provided by the system 102 to particular individuals provides each individual with a clear representation of their current skills and how those skills lend themselves to their career and future career potentials.

Figure 6:
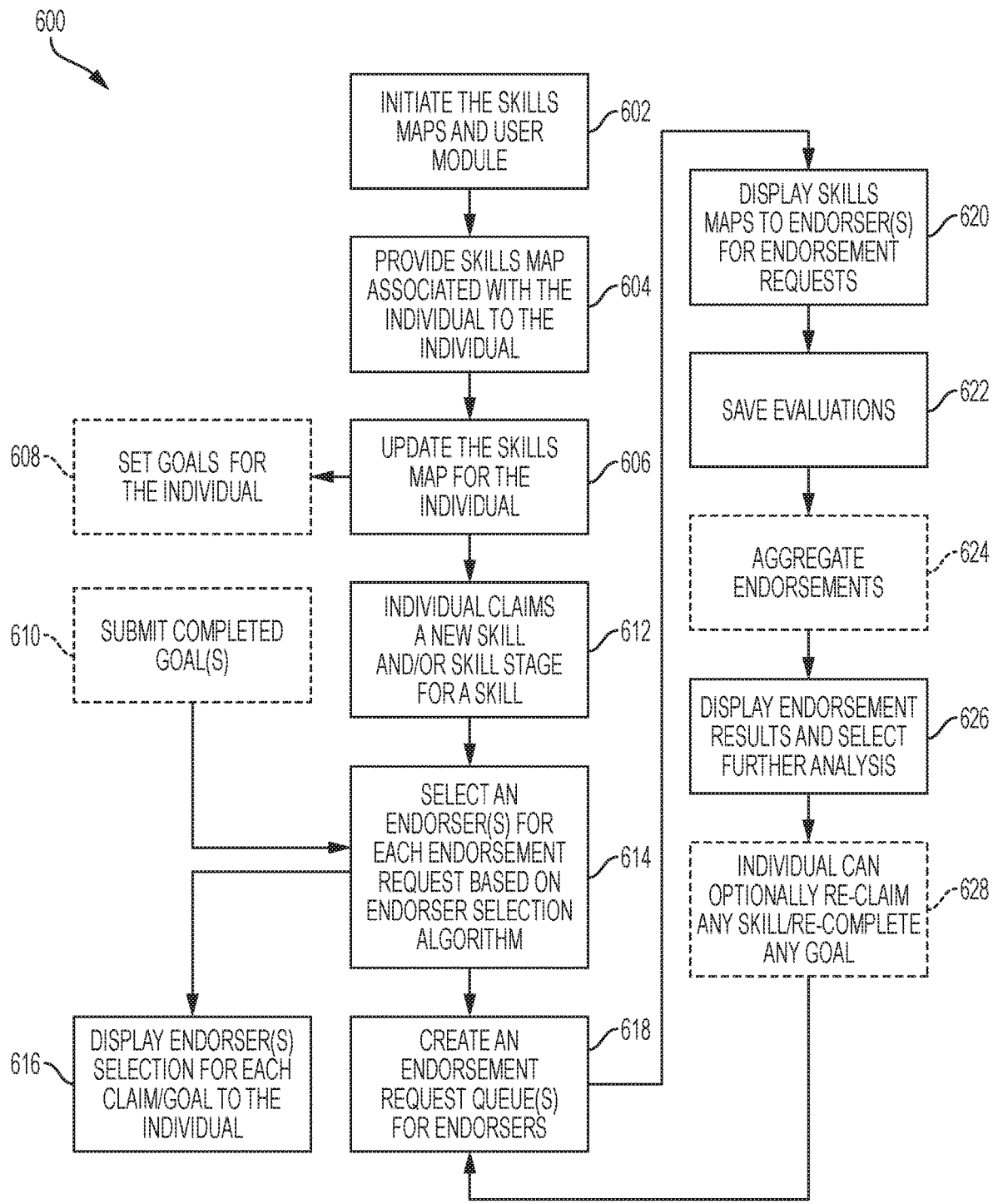
FIG. 6 is an illustrative flowchart depicting an exemplary operation of the skills map and user assessment modules, in accordance with aspects of the present invention.

FIG. 6 depicts an exemplary flow chart depicting implementation of the endorsement process 600 in accordance with the present invention. In particular, FIG. 6 depicts a process 600 for an individual populating and/or updating a skills map and submitting the skills map to another individual (e.g., coach, supervisor, peer, etc.) for endorsement, as discussed with respect to FIGS. 1-5. The process 600 starts at step 602 with the initiation of the skills map and user module 116. The skills map and user module 116 can be initiated through any combination of systems and methods known in the art. For example, the skills map and user module 116 can be initiated by the individual selecting an icon for their skills map in a graphical user interface (GUI) provided on the user device 126.

At step 604 the skills map and user module 116 provides an initial skills map to the individual. The initial skills map is a skills map associated with the individual and includes a skill set tailored to the individual and the position/role that the individual fills within an organization. An example skills map is provided in FIG. 5A. The skills map includes an initial set of skills and initial skill stages for each of those skills. In accordance with an example embodiment of the present invention, the provided skills map includes a default set of skills (and corresponding skill stages) selected based on the profession and role of the individual within an organization.

At step 606 the default set of skills (and corresponding skill stages) within the skills map are modified to be specifically tailored to the position or role that the individual holds within an organization. Alternatively, the individual can be provided with a blank skills map that has to be initially populated by the individual or another user (e.g., a coach, supervisor, human resources, etc.). With the skills map provided, the individual or another user (e.g., a coach, supervisor, human resources, etc.) updates the skills map to initially reflect the skills and skill stages possessed and/or required by the individual. The updating of the skills map can include adding skills, removing skills, and/or modifying a skill stage of a skill (as defined by a skills catalog and or skills curricula). As would be appreciated by one skilled in the art, the skills map can be updated utilizing any combination of systems and methods known in the art. For example, the skills map can be updated by selecting/modifying skill entries within the skills map as provided in the graphical user interface as provided in FIG. 5B. In particular, FIG. 5B depicts a skill that has been selected and provided options for setting a stage (e.g., not prioritized, learning, doing, etc.) of that skill. Once the skills map is updated, the process 600 will advance to step 612.

Prior to or at a later point in time from the process of step 612, the individual can optionally set goals for one or more of the skills within the skills map, as reflected by step 608 (e.g., via the goal setting and planning module 124). At step 608 the user can add one or more skill goals corresponding to one or more skills within the skills map (a "goal" in this case means a stated intention to achieve a specific skill stage in a specific skill). Once the individual has met one of the skill goals provided in step 608, or the individual believes that they have met the goal, the completed goal is submitted to the skills map and user module 116 at step 610. In particular, at step 610 the individual submits a "claim" that they have met a skill goal (e.g., advanced to a new skill stage within a previously claimed skill) such that they skill map should be updated to reflect the new skill stage or skill. The completed skill goals will cause the process 600 to advance to step 614.

At step 612 the individual can submit a skill claim to define what the individual believes is their currency skill stage in each skill. In accordance with an example embodiment of the present invention, skill claims are made by individuals when initially filling out their skill chart. Thereafter, any changes to skill stages are submitted by the individual as skill goals. As would be appreciated by one skilled in the art, the skill claims could similarly be used in skill advancement without departing from the scope of the present invention. For example, if the individual believes that their mastery in a skill has advanced from doing to teaching, then the individual submits a claim adjusting the skill stage for the skill from doing to teaching. As would be appreciated by one skilled in the art, individuals are not limited to identifying skill stages only for the skills initially provided within their skills map or a skills map associated with their role within a company. Instead, an individual is able claim any skills within the skills framework that they possess.

The skill claim submission process, at step 612, can be executed by the individual at any point in time after the skills map has been initialized for the first time and updated in steps 602-606. For example, the process at step 612 can occur as an initial skill evaluation (skill map population), as part of an annual review, or at a random point in time that the individual believes that they should be assessed at a certain skill stage for a given skill. In accordance with an example embodiment of the present invention, the individual can only update a skill within a skills map one time over a predetermined period of time. For example, an organization could establish that each individual has one month following their initial onboarding onto the system during which to make skill claims. The claim of a particular skill stage for a skill selected by the individual is recorded by the skills map and user module 116 and the skills map for that individual will be updated accordingly (pending an endorsement review). Additionally, in accordance with an example embodiment of the present invention, during the initial (e.g., one-month) skill claim period, users can only claim stages of "not prioritized", "learning", and "doing". It is only during the creation and submission of skill goals that an individual can progress to the other stages.

The process at step 614 is triggered when an individual has initiated a skill claim for an entirely new skill, a skill claim for a particular skill stage of a skill (at step 612), and/or has submitted completion of a skill goal (at step 610) created in step 608. Each of the skill claims and skill goal submissions is conveyed to an endorser(s) for review as an endorsement request. At step 614 an endorser(s) is selected for each endorsement request. For example, the skills map and user module 116 aggregates a list of colleagues (e.g., peers, managers, supervisors, etc.) that are determined to be best suited to verify the claimed skill or skill stage of the individual (e.g., a colleague who has already mastered said skill stage) and selects the endorser(s) from the list. For example, the list of endorsers can include a colleague(s) who works closely with the individual and is capable of objectively determining if the individual has in fact mastered the proposed skill or skill stage. An endorser might be someone who is otherwise qualified to evaluate the endorsee's work if they are made familiar enough with it, such as an "expert" in the skill (meaning anyone at the skill stage of the endorsement request, whether they are within the organization or even outside of the organization).

In accordance with an example embodiment of the present invention, the skills map and user module 116 selects an endorser(s) for each skill claim/goal based on a determination by an endorser selection algorithm. The endorser selection algorithm determines a level of risk of endorsing the endorsement request and then determines how many people must endorse the skill change based on the determined level of risk. The endorser selection algorithm also determines who will be the endorser(s) and the required level of agreement to provide the endorsement. TABLE 3 depicts an example risk evaluation table which can be utilized by the endorser selection algorithm to determine a level of risk for given endorsement request. In particular, TABLE 3 depicts table for determining a level of risk based on a skill stage of the endorsement request (e.g., proposed skill change) and the corresponding skill weight for that endorsement request (note, these values are merely illustrative and not limiting of the invention).

TABLE 3

| | | Skill Weight | | | | |
|---|---|---|---|---|---|---|
| | | 0 | 1 | 2 | 3 | 4 |
| Skill | A | None | None | None | None | None |
| Stage | B | None | None | Low | Low | Low |
| | C | Low | Low | Low | High | Very high |
| | D | Low | Low | Medium | High | Very high |
| | E | Low | Low | Medium | High | Very high |
| | F | Very high | Very high | Very high | Very high | Very high |
| | G | Very high | Very high | Very high | Very high | Very high |

As an example, an endorsement request for a change of a skill stage from "C" to "D" with a corresponding skill weight for stage "D" (e.g., according to the values stored in the skill framework) of "3" would have a risk level of "High". Based on the determined level of risk, the endorser selection algorithm can further determine a number of endorser(s) and rules for the endorsement request to be endorsed (approved), and thus resulting in the skill map for the requesting individual being updated. TABLE 4 depicts an example table for determining the number of endorsers, the endorser(s)'s identity, and rules for required to approve the endorsement request (note, these values are merely illustrative and not limiting of the invention). The denomination "coach", as depicted in TABLE 4, is a type of relationship delineated in the system, either by administrators or users. Every user must have at least one coach; in some implementations, coaching relationships might be used to mirror existing managerial relationships within an organization. Coaching relationships are primarily used for the endorser selection algorithm to select specific individuals as endorsers for endorsement requests, but as would be appreciated by one skilled in the art, they may also be used for other functions in the system (e.g., responsible for uploading curricula, responsible for carrying out the compensation algorithm, etc.).

TABLE 4

| Risk level | Endorser(s) | Rules for passing |
|---|---|---|
| Very high | Coach, coach's coach, two experts | Unanimity |
| High | Coach, two experts | Majority |
| Medium | Coach, one expert | Unanimity |
| Low | Coach | N/A |
| None | N/A | N/A |

Continuing the previous example, with the determination of a "High" risk level for approving the endorsement request, the endorser selection algorithm can reference TABLE 4 to determine that three endorsers are required, that one of the endorsers has to be a coach and two have to be experts. Additionally, TABLE 4 indicates that a majority of the three endorsers is required to approve the endorsement request. As would be appreciated by one skilled in the art, TABLES 3 and 4 are provided for exemplary purposes and the present invention does not need to rely on tables to implement the functionality discussed herein. The information provided by TABLES 3 and 4 can be implemented in any combination of methods and systems known the art. For example, TABLES 3 and 4 can be database entries accessed by the endorser selection algorithm for making the various determinations. Furthermore, the information provided in TABLES 3 and 4 are merely exemplary examples and the values within the tables can be changed without departing from the scope of the present invention. Additionally, when relevant, other components might be added to or subtracted from the endorser selection algorithm to determine risk and the rules determined by the risk levels. Once the endorser(s) has been selected by the skills map and user module 116, the process 600 will advance to steps 616 and/or 618.

At step 616 the endorser selected through the endorser selection algorithm is provided to the individual (e.g., via a GUI display) for each claims skill and/or submitted skill goal endorsement request. As would be appreciated by one skilled in the art, alternatively to the endorser selection algorithm, the individual can select a preferred endorser without departing from the scope of the present invention. If the individual selects their own endorser, the process 600 will not advance to step 616 and advance to step 618.

At step 618 the skills map and user module 116 creates endorsement request queue(s) for each of the endorsers receiving endorsement requests. In accordance with an example embodiment of the present invention, the endorsement requests within each of the queue(s) are prioritized based on the endorser selection algorithm. In particular, the endorsement request queue(s) prioritize which endorsement requests are sent to which endorsers as well as the priority level in which the endorser would endorse the requests. One aspect of the endorser selection algorithm includes weighting the endorsement request queue(s) to prioritize skill claims and skill goal submissions that are most impactful to the organization such that endorsement requests with high or very high risk determinations will be prioritized over low or no risk determinations. For example, the endorsement queue(s) will prioritize skill claims that would have a negative impact on the organization if incorrect (e.g., if determined to be too high of a level for the individual).

At step 620 the selected endorser(s) are provided with the endorsement requests requiring their review. In accordance with an example embodiment of the present invention, endorsers are provided with the skills maps for individuals requesting endorsement with any specific skills or skill goals that require endorsement highlighted. When the endorser(s) view the endorsement requests they may mark the endorsement request as endorsed, not endorsed, or skipped. Additionally, the endorser(s) can submit feedback as to why the endorsement requests endorsed, not endorsed, or skipped. When an endorsement request is endorsed, the endorser is confirming that the individual has achieved the desired skill stage (e.g., a specific level of mastery in a skill) and/or met the submitted skill goal submitted in the endorsement request. For example, if an individual had submitted skill stage change to a teaching level of mastery in an endorsement request, the endorsement is confirming that the endorser believes that the individual has reached that skill stage (e.g., teaching) for the skill. When an endorsement is skipped it remains in the endorser's queue until the endorsement request is endorsed or negatively endorsed. When an endorsement request is negatively endorsed (e.g., endorsement is denied) the endorser is indicating to the individual that the individual has not reached that current stage. In addition to the negative endorsement, the endorser may elect to add feedback (e.g., via the surveying and feedback module 118) with comments as to why the skill stage was not endorsed and what the individual can improve upon to earn the endorsement at a further point in time (e.g., with a future endorsement request). As would be appreciated by one skilled in the art, the endorser(s) can answer endorsement requests at a predetermined rate or self-determined rate.

At step 622 the skill map for the individual is updated (e.g., via the skills map and assessment module 116) to reflect the endorsed skill or completed skill goal, or lack thereof. The updated skills map will subsequently be saved (e.g., within the storage system 114). In situations where there is more than one endorser for a particular endorsement request, the skills map and user module 116 aggregates all of the endorsements and update the skills map to include all of the endorsements (or denied endorsements) at optional step 624.

At step 626 the skills map and user module 116 returns the updated skills map to the requesting individual(s). The updated skills map can include a summary and/or highlighting of any skill claims and/or skill goal submissions that have been endorsed, denied an endorsement, and pending endorsements. In particular, individuals can see all of the endorsers for each endorsement request and the corresponding responses and statuses for each of the endorsement requests. The information conveyed in step 626 is designed to increase trust in the system 102 and motivate individuals to map accurately so that their own development is accurate. Additionally, at step 626, the skills map and user module 116 will provide the individual with an opportunity to view additional feedback provided by the endorser, if any (e.g., via the surveying and feedback module 118). For example, further analysis can include public/global comments related to the skill being endorsed, analytics depicting the distribution of skill stages throughout the organization for the given skill, etc.

After review of the updated skill maps and the endorser response(s), the individual can optionally reclaim a skill or resubmit a skill goal to be submitted as an endorsement request again (at step 628). In particular, at step 628 the individual can reclaim a skill or resubmit a skill goal that was previously submitted for endorsement at an earlier point in time. For example, the individual can continue building on tasks for a skill stage (e.g., as indicated by an endorser) and resubmit when those tasks have been mastered appropriately. The resubmission process of step 628 will cause the endorsement request to be added to the queue at step 618 and repeat steps 618-626.

Figure 7:
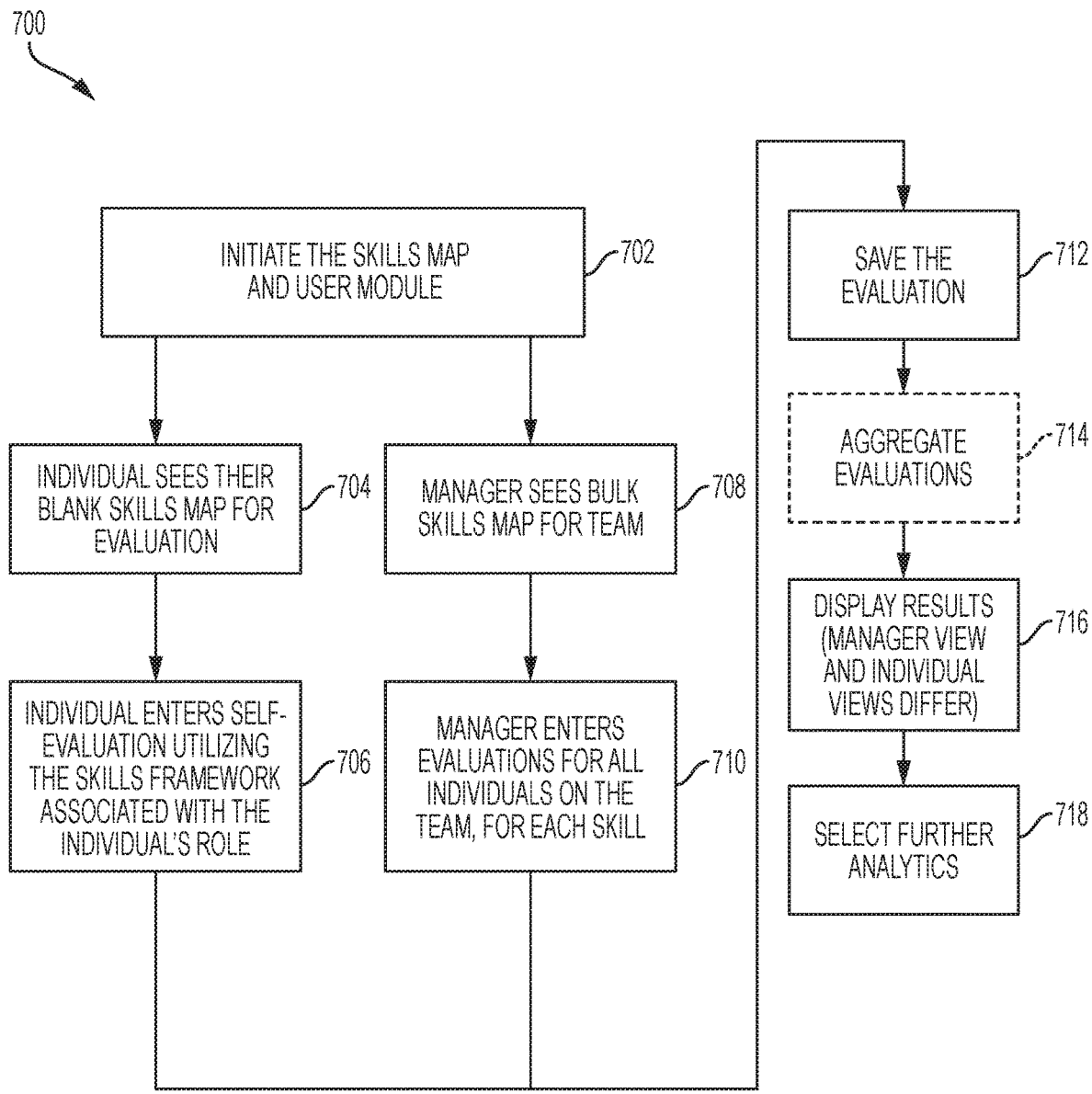
FIG. 7 is an illustrative flowchart depicting an exemplary operation of the skills map and user assessment modules, in accordance with aspects of the present invention.

FIG. 7 depicts an exemplary flow chart depicting implementation of the evaluation process 700 in accordance with the present invention. Specifically, FIG. 7 depicts an exemplary flow chart showing the operation of system 100, as discussed with respect to FIGS. 1-5, with respect to performing an evaluation on an individual. Once the skills endorsement on an individual and/or evaluation of an individual has been performed, (as provide in FIGS. 5 and 6) the resulting modified skills framework can be further utilized by the skills map and user assessment module 116 to perform analytics, as discussed in greater detail with respect to FIG. 8.

The evaluation process 700 starts with initiation of the skills map and user assessment module 116 and loading of a skillset or skills map for an individual being evaluated. At step 702, the skills map and user assessment module 116 is initiated utilizing any combination of software and hardware known in the art. For example, the skills map and user assessment module 116 can include a software program installed on the computing device 104 configured to carry out the evaluation process 700. In accordance with an example embodiment of the present invention, upon the initiation of the skills map and user assessment module 116 at step 702, a graphical user interface is presented to a user. The graphical user interface can be generated utilizing any combination of systems known in the art. In accordance with an example embodiment of the present invention, the skills map and user assessment module 116 is configured to generate different graphical displayed based on the user accessing the analyzer system 102. For example, the individual being evaluated has a graphical display with information displayed and a reviewing user has a different graphical display with different information displayed.

Depending on the type of user and the type of task being carried out the system will advance to step 704 or step 706. In particular, if the skills map and user assessment module 116 determines that the user is an individual performing a self-evaluation, then the process 700 will advance to step 704. Alternatively, if the skills map and user assessment module 116 determines that the user is a manager performing one or more evaluations for team members under their supervision, then the process 700 will advance to step 708. As would be appreciated by one skilled in the art, the determination can be executed utilizing any methodology and system known in the art. For example, the determination can be based on a user login and credentials and/or a selection from a menu for a self-evaluation or a manager evaluation.

At step 704, the user (the individual being evaluated) can utilize the graphical user interface provided by the skills map and user assessment module 116 to select an individual or position for self-evaluation. In particular, the skills map and user assessment module 116 provides the user with a graphical view of a blank skills map, associated with the user, for evaluation. As discussed herein, the skills framework for the individual(s) being evaluated already exist and provide a combination of skills that specifically apply to the individual and the position that the individual occupies within the organization. As discussed with respect to FIG. 1, each skill framework or combination of skills includes a combination of skills that are associated with a particular position within an organization. The number of skills included in the combination of skills in a skills framework for a particular individual can vary based on position and experiment. For example, a skills framework for an individual can include seventy separate skills representing different bundles of skills, as depicted in FIG. 3. As would be appreciated by one skilled in the art, each combination of skills can be predetermined sets of skills that were previously entered during initial setup of the skills map and user assessment module 116, prior to performing any evaluations.

At step 706, the user populates the blank skills map utilizing the skills framework associated with the user's role within the organization. As discussed with respect to FIG. 1, the evaluation is performed by assigning a mastery a skill weight associated with a skill stage for each skill in the skillset associated with the individual. Once the user completes populating the skills map, the process 700 advances to step 712.

At step 708, the manager user is provided a bulk skills map for individuals within the team under control of the manager. The manager is provided a graphical user interface by the skills map and user assessment module 116, similarly to the process in step 704. Additionally, the skills map and user assessment module 116 can provide the manager with the option to evaluate individual members or position within the team. The selection of the individual or position to be evaluated can be executed utilizing any known methodology known in the art. For example, the user can select a name of an individual from a drop down menu.

At step 710, the manager user populates the blank skills map utilizing the skills framework associated with each individual's role within the organization. As discussed with respect to FIGS. 1-5, the evaluation is performed by selecting a sub-category (e.g., not prioritized to inventing) for each skill in the skillset (with the sub-category being associated with a skill weight and the skill being associated with skill stage by the skills map and user assessment module 116) associated with the individual. In accordance with an example embodiment of the present invention, the user entering the evaluation can be any user qualified to objectively evaluate the individual. For example, the user can be any individual with a higher level of skills than the individual being evaluated (e.g., manager, peer, supervisor, etc.). During the evaluation process of step 708, the user completes the skill stages within the skills framework provided in step 706. As would be appreciated by one skilled in the art, the completion of the evaluation skills levels can include filling in a form with entries for skill stages for each skill stage. The skill stages entered during the evaluation are entered based on the skill assessment progression, as discussed with respect to FIGS. 1-5. In particular, the user can select a skill stage for each skill corresponding to one of not prioritized, actively learning, doing, ready to teach, teaching, tool building, inventing. The skill stage selection is a binary value such that the user is limited to selecting one of the skill stages for each skill. As discussed with respect to FIGS. 1-5, each skill stage (e.g., not prioritized, actively learning, doing, ready to teach, teaching, tool building, inventing) is associated with a different weighted skill weight to be utilized in other computations (e.g., as processed in FIG. 8). As would be appreciated by one skilled in the art, the user performing a self-evaluation, at step 706, populates their skills map utilizing a similar methodology. Once the user completes populating the skills map, the process 700 advances to step 712.

At step 712 the user (the individual user or the manager user) saves the evaluation upon completion. As would be appreciated by one skilled in the art, the selected skill stages for an individual can be saved mid-evaluation and reloaded later to be completed. The saving can be carried out by the user surveying and feedback module 118.

At optional step 714 the skills map and user assessment module 116 aggregates the evaluations for the individual. Step 714 is only necessary if more than one user is evaluating an individual. If multiple users evaluate an individual, the results of the evaluations can be averaged to produce a single evaluation for each skill in the skills framework for the individual. In particular, the skills map and user assessment module 116 takes individual averages of the skills levels assigned to each skill within the skills framework. In order to average each skill individually, the skills map and user assessment module 116 converts each skill stage provided by the users into the corresponding skill weight, as discussed with respect to FIGS. 1-5. Once the skill stages are converted to their respective skill weight, then the averaging can be performed. For example, if two users rate a particular skill as doing and ready to teach, then the skill stages are converted to skill weight 5 and 8 respectively (according to TABLE 1). With the skill weight know, the skills map and user assessment module 116 can average the values (e.g., (5+8)/2=6.5). As would be appreciated by one skilled in the art, each individual skill in the skills framework can be averaged utilizing any averaging mechanism known in the art.

At step 716 the aggregated results or single result of the evaluation(s) can be organized and displayed to the user. As would be appreciated by one skilled in the art, the results can be organized and displayed in any suitable format known in the art. For example, the results can be displayed in a list format, card-based format, a tabular format, or other graphical formats. Additionally, the information displayed at step 716 can be organized to display particular sets of information useful for the user. For example, the evaluation data can be organized and displayed to depict which skills the individual has mastered, which skills require additional training required by a current position, which skills are needed to advance to a new position, which skillsets make up a particular position, etc. Additionally, groups of evaluations for multiple individuals can be organized and displayed in a useful format. For example, multiple evaluations can be combined for displaying a detailed view of the skills that will enable the entire department to perform at its best to a manager.

In accordance with an example embodiment of the present invention, at step 716, the user surveying and feedback module 118 can share the evaluations performed by the individual user and/or the manager user with the other user. When the individual user and the manager user have both completed evaluations for the individual, both evaluations are shared with both users. The users will be able to view their own evaluation and the evaluation from the other user in a combined skills framework evaluation. In particular, the user surveying and feedback module 118 can combine the evaluations such that each skill shows the sub-category names (associated with skill weight ratings) from both users with identifiers (e.g., color coded, text, etc.) for which rating was provided by which user. In the case of the manager user, the manager user can review the self-evaluation from the individual user with their own evaluation and make any adjustments based on the review. Once any adjustments have been made the final evaluation can be saved and shared with the individual. Once all of the final evaluation is shared, the manager can "publish"/finalize and the skills map is saved and locked for a predetermined period of time (e.g., three to six months), depending on the frequency of planned review and update.

At step 718 the user can select that an evaluation for an individual be utilized for additional processing methodologies, analytics, and/or algorithms. For example, the evaluation for individuals can be utilized to perform career paths or compensation determinations for individuals. As would be appreciated by one skilled in the art, certain additional processing methods may only be accessible by certain users. For example, only manger users can perform a compensation calculation based on the evaluation. The additional processing/analytics related to career paths can include conveying to the user exact skills that are required for a complete career path while mapping out a chronology of steps for developing skills to fulfill that career path. A user can identify a desired career path and visualize the skills required to reach that path with a plan for reaching the destination position. Additionally, positions can be displayed that match or closely match a user's current skills framework. Accordingly, the skills map and user assessment module 116 provides a tool enabling a user the ability to reflect on their career, consider their long-term aspirations, their near- to mid-term learning goals, and the skills that will help them reach those goals.

Figure 8:
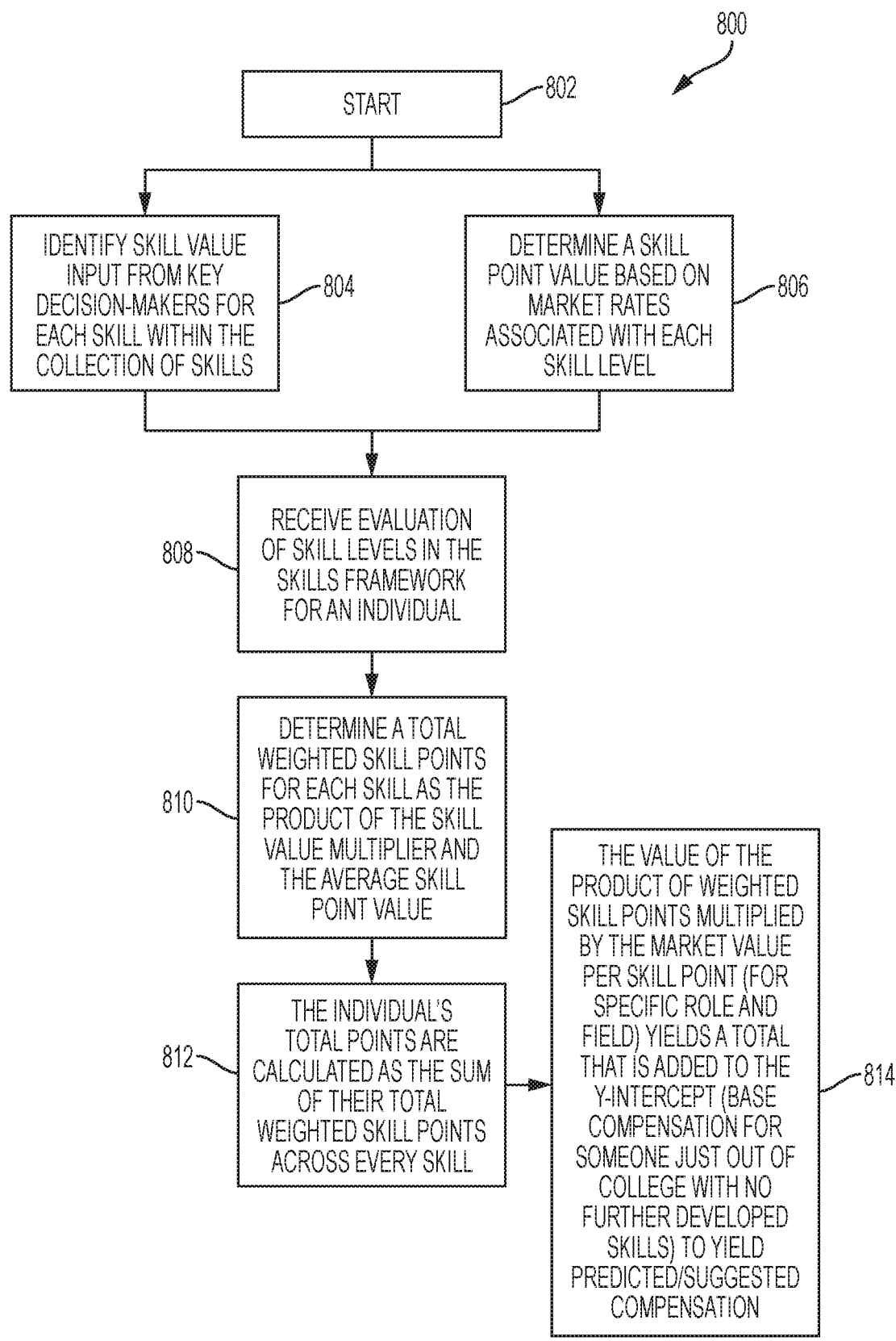
FIG. 8 is an illustrative flowchart depicting an exemplary operation of the compensation calculation module, in accordance with aspects of the present invention.

An example implementation of the compensation determination is depicted in and discussed in greater detail with respect to FIG. 8. In particular, FIG. 8 depicts a process 800 provided by the compensation calculation module 120 for calculating compensation for an individual based on the evaluation(s) of skills for the individual, as performed in FIG. 6 or FIG. 7. Step 802 begins the initiation of the compensation computation process 800. At step 802 the provided by the compensation calculation module 120 can initiate the compensation calculation through activation by a user. For example, user (e.g., manager, supervisor, etc.) can select a function in a graphical user interface to perform a compensation computation for a particular individual, as discussed in step 716 of FIG. 7.

At step 804 the compensation calculation module 120 identifies skill values (e.g., low-very high) assigned to each skill in the collection of skills, each of the one or more skill values associated with a value multiplier. The skill value multiplier indicates relative importance of skills within an organization. The compensation calculation module 120 can associate the appropriate skill value multiplier with each skill in the collection of skills. Additionally, the compensation calculation module 120 can organize and store the skill value multipliers for each skill in the collection of skills for additional processing.

In accordance with an example embodiment of the present invention, the skill values are assigned to the skills during prior setup steps for the analyzer system 102, as discussed in greater detail herein. For example, analyzer system 102 receives skill value input from key decision-makers (e.g., administrators) for each skill within the collection of skills during a configuration stage of the skills. Additionally, when there is multiple skill values received from decision makers, the analyzer system 102 can initially calculate an average skill value for each skill in the collection of skills by averaging all value multipliers associated with each of the skills. The resulting average skill value provides a single skill value for each skill in the collection of skills to be utilized in additional processing steps.

At step 806 the compensation calculation module 120 determines a skill weight for each received skill stage in the evaluation for each skill in the collection of skills, as discussed with respect to FIG. 1. In particular, the compensation calculation module 120 determines a skill weight based on market rates associated with each skill stage. The skill weights represent a predetermined value multiplier for each skill stage in the collection of skills. The skills map and user assessment module 116 can organize and store the skill weight for each skill in the collection of skills for additional processing. Additionally, when multiple users provide skill stages, the compensation calculation module 120 calculates average skill weights for each skill in the collection of skills. The resulting average skill weight provides a single skill weight for each skill in the collection of skills to be utilized in additional processing steps. For example, the averaging can be calculated as discussed with respect to step 714 of FIG. 7.

At step 808 the skills map and user assessment module 116 receives a complete evaluation for an individual from a user interface. As would be appreciated by one skilled in the art, the compensation calculation module 120 can also retrieve a previously saved evaluation from storage (e.g., the storage system 114). The received or retrieved evaluation includes the skill stages ratings from a reviewing user for each skill in a collection of skills associated with an individual, as discussed with respect to steps 706 and 712 of FIG. 7.

At step 810 the compensation calculation module 120 determines a total weighted skill weight for each skill. The compensation module 120 collects a set of compensation benchmarks from the user for specific users in the system. Those users are identified based on weighted averages of their skills levels, identifying users who represent widely different levels of skills. Using their actual target compensation levels and their weighted average skill stages, a value per skill weight is calculated. In particular, the compensation calculation module 120 determines a total weighted skill weight by multiplying the average skill value for each skill in the collection of skills (from step 804) by the average the skill weight (from step 806) for each skill in the collection of skills. The result of the calculation is a total weighted skill weight for each skill in the collection of skills.

At step 812 the compensation calculation module 120 calculates a total skill weights for the individual by summing the total weighted skill weight for each skill in the collection of skills calculated in step 810. As a result, the evaluation of a plurality of skills in the collection of skills associated with an individual are condensed into a single numeric variable (e.g., total skill weights).

At step 814 the compensation calculation module 120 calculates compensation for an individual based on the total skill weights provided in step 812. The compensation is calculated by the compensation calculation module 120 applying a compensation model to the total skill weights for the individual. The compensation model provides a monetary value per skill weight based on baseline compensation for an individual out of college with no further developed skills. The compensation calculation module 120 determines a compensation level for the individual by obtaining a product of the total skill weights multiplied by the predetermined monetary market value per skill weight provided by the compensation model.

Figure 9B:
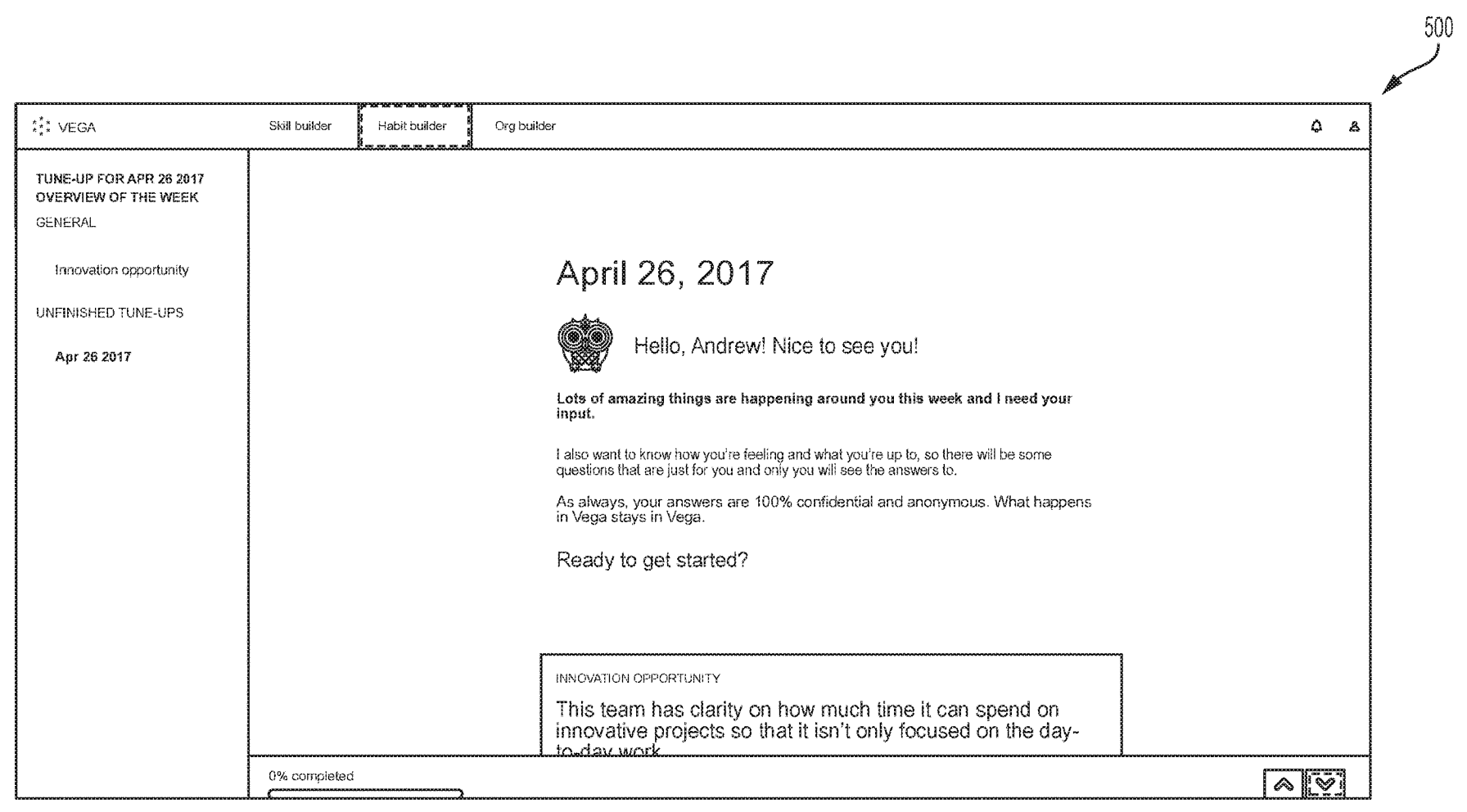
Figure 9C:

FIGS. 9A-9E show exemplary graphical user interfaces 500 for conducting the endorsements of individuals in accordance with the present invention. In particular, FIGS. 9A-9E show exemplary screens used during an endorsement process as discussed with respect to FIG. 6. FIG. 9A depicts a screen within the graphical user interface 500 in which an endorser accesses a survey feedback tool for replying to available endorsement requests. The endorser can access the survey feedback tool by selecting the endorsement card 506. By selecting the endorsement card 506 the graphical user interface 500 proceeds to feedback tool welcome screen depicted in FIG. 9B. The feedback tool welcome screen can include a message to the endorser with additional information and/or instructions. Additionally, from the feedback tool welcome screen depicted in FIG. 9B, the endorser can start reviewing any available endorsement requests.

Figure 9D:

FIG. 9C depicts an example skill claim endorsement request as displayed by the graphical user interface 500 to the endorser. The skill claim endorsement request displays the individual is making the endorsement request, what skill or skill stage change the individual is claiming, and provide a checklist (as depicted in greater detail with respect to FIG. 9D) for the endorser to fill out regarding making the endorsement or denying the endorsement. Additionally, as depicted in FIG. 9C, the graphical user interface 500 can provide the endorser with options to see additional information (e.g., definition, examples, etc.) about the skill relating to the skill claim. FIG. 9D depicts the checklist for the endorser to fill out regarding making the endorsement or denying the endorsement. Using the checklist, the endorser checks off all of the statements that apply to the endorsement request claim. Thereafter, based on the checklist, an endorsement is made or denied. Additionally, as depicted in FIG. 9D, the endorsement screen can provide an area for the endorser to provide customized feedback for display to the individual with the corresponding endorsement decision.

After completing the checklist, as updated in the graphical user interface shown in FIG. 9E, the endorser then selects the option that best characterizes their evaluation of the individual. The options, as depicted in FIG. 9E, include, but are not limited to, "I don't have enough context", "Goal is complete", and "Not just yet". The "I don't have enough context" option indicates that the endorser is skipping on the endorsement, at least until the endorser has more information. The "Goal is complete" option indicates that the individual is endorsed for the requested skill and the skill map is officially updated for the requested skill level. The "Not just yet" indicates that the endorsee is not mapped at the requested level, and thus the skill goes back to an unmapped state (or some other state, predetermined by the administrator).

Figure 10:
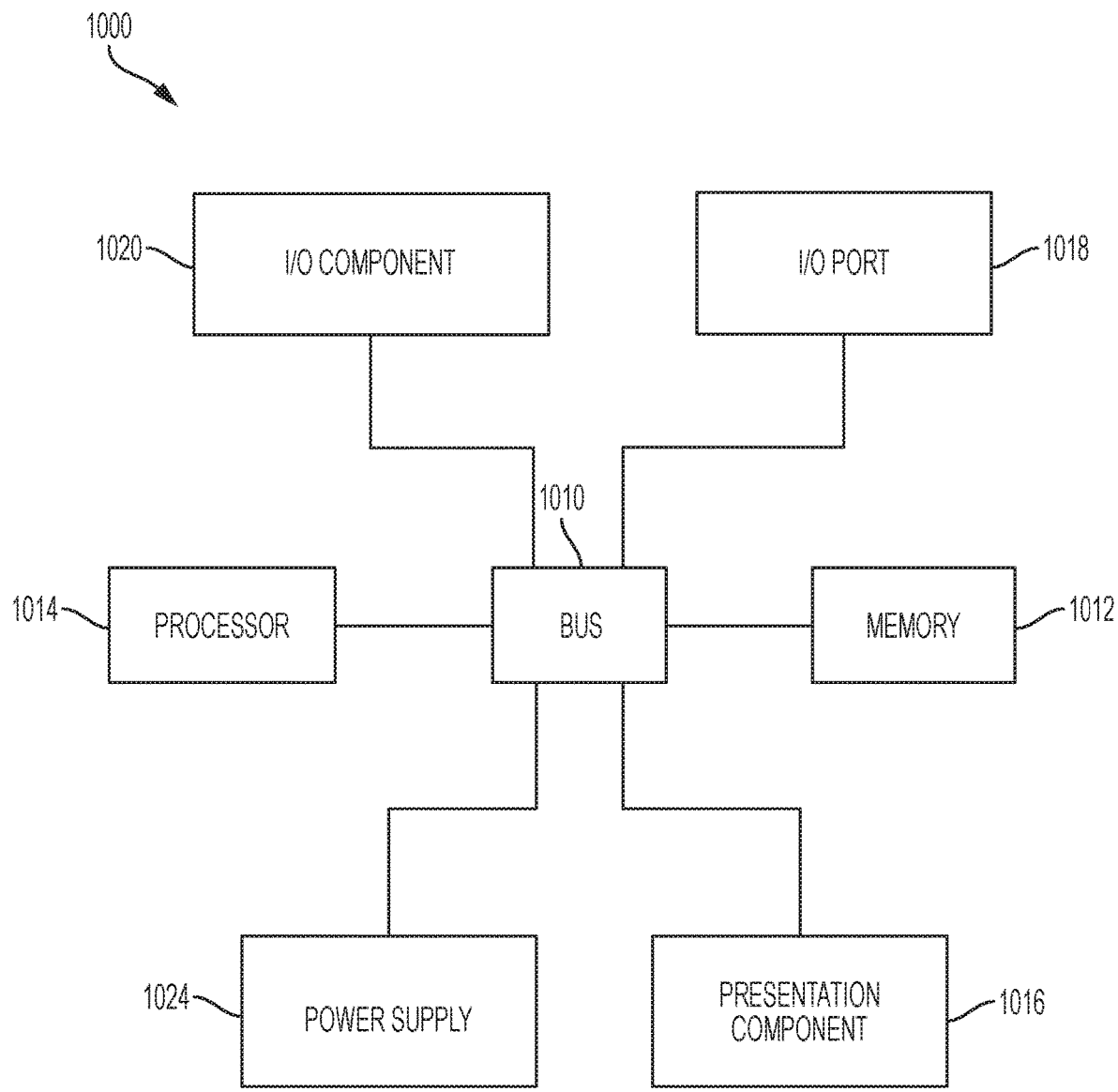
FIG. 10 is a diagrammatic illustration of a high level architecture for implementing processes, in accordance with aspects of the present invention.

Any suitable computing device can be used to implement the computing devices 102, 104, 126 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 1000 is depicted in FIG. 10. The computing device 1000 is merely an illustrative example of a suitable computing environment and in no way limits the scope of the present invention. A "computing device," as represented by FIG. 10, can include a "workstation," a "server," a "laptop," a "desktop," a "hand-held device," a "mobile device," a "tablet computer," or other computing devices, as would be understood by those of skill in the art. Given that the computing device 1000 is depicted for illustrative purposes, embodiments of the present invention may utilize any number of computing devices 1000 in any number of different ways to implement a single embodiment of the present invention. Accordingly, embodiments of the present invention are not limited to a single computing device 1000, as would be appreciated by one with skill in the art, nor are they limited to a single type of implementation or configuration of the example computing device 1000.

The computing device 1000 can include a bus 1010 that can be coupled to one or more of the following illustrative components, directly or indirectly: a memory 1012, one or more processors 1014, one or more presentation components 1016, input/output ports 1018, input/output components 1020, and a power supply 1024. One of skill in the art will appreciate that the bus 1010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 10 is merely illustrative of an exemplary computing device that can be used to implement one or more embodiments of the present invention, and in no way limits the invention.

The computing device 1000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices that can be used to encode information and can be accessed by the computing device 1000.

The memory 1012 can include computer-storage media in the form of volatile and/or nonvolatile memory. The memory 1012 may be removable, non-removable, or any combination thereof. Exemplary hardware devices are devices such as hard drives, solid-state memory, optical-disc drives, and the like. The computing device 1000 can include one or more processors that read data from components such as the memory 1012, the various I/O components 1016, etc. Presentation component(s) 1016 present data indications to a user or other device. Exemplary presentation components include a display device, speaker, printing component, vibrating component, etc.

The I/O ports 1018 can enable the computing device 1000 to be logically coupled to other devices, such as I/O components 1020. Some of the I/O components 1020 can be built into the computing device 1000. Examples of such I/O components 1020 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method of modeling compensation level determinations, the method comprising:
   a user interface receiving a skill stage for each skill in a collection of skills associated with an individual, the skill stage indicating a level of mastery the individual has obtained in each skill;
   a skills map and user assessment module generating a graphical user interface conveying information to the individual and receiving data related to the individual comprising skills maps associated with the individual mapping out sets of skills wherein the collection of skills becomes a skills map for the individual;
   the skills map and user assessment module maintaining a skill assessment progression that provides an objective skill progression for achieving different skill stages or levels of mastery of a skill for each skill included in a skills framework, providing a structured evaluation system for observable behaviors of individuals rather than subjective criteria of performance, wherein an artifacts module captures and stores artifacts of qualifications for performing each skill and the skill assessment progression is derived by identifying skills for an individual and identifying different levels of mastery for each skill in the skills framework at which an individual is executing a skill;

the skills map and user assessment module and a processor determining a skill weight for each received skill stage for each skill in the collection of skills, the skill weight is a predetermined value multiplier based on the skill stage;

the skills map and user assessment module identifying one or more skill values assigned to each skill in the collection of skills, each of the one or more skill values associated with a value multiplier;

the skills map and user assessment module and the processor calculating an average skill value for each skill in the collection of skills by averaging all value multipliers associated with the one or more skill values;

the skills map and user assessment module transforming the skill weight for each skill in the collection of skills into a weighted skill weight for each skill in the collection of skills, wherein transforming comprises multiplying the average skill value for each skill in the collection of skills by the predetermined value multiplier of the skill weight for each skill in the collection of skills;

the skills map and user assessment module, using the processor, calculating total skill weights for the individual by summing the weighted skill weight for each skill in the collection of skills, the skills map and user assessment module storing, organizing, managing, and presenting skill stage assessments, wherein skill stages and associated skill values are created, modified and deleted in a database and then re-evaluated, updated and accessed utilizing the graphical user interface; and a compensation calculation module computing compensation for individuals correlated to a value the individual contributes to the organization based on skill stage assessments provided by users against a comprehensive map of skills comprising calculating a compensation level determination for the individual by obtaining a product of the total skill weights multiplied by a predetermined monetary market value per skill weight.

2. The method of claim 1, wherein users upload documents or models via the artifacts module, and wherein skill stages do not represent levels of proficiency of an individual associated with a given skill but represent value to the organization by how greatly each stage contributes to overall performance of the organization, wherein the one or more skill values:
are one of a low quantity, medium quantity, high quantity, and very high quantity; and
indicate a relative level of importance of an associated skill is to an organization.

3. The method of claim 1, wherein the one or more skill values are provided by a weighting table for skill stages.

4. The method of claim 1, wherein the value multiplier is a predetermined quantity associated with a level of skill.

5. The method of claim 1, further comprising determining a compensation level for the individual based on the total skill weights for the individual.

6. The method of claim 5, wherein determining the compensation level comprises calculating a product of the total skill weights multiplied by a predetermined monetary market value per skill weight, and further comprises dictating a desired career path or a predicted compensation range following future evaluations.

7. The method of claim 5, further comprising:
receiving, from a plurality of users using computing devices, a plurality of skill stages on a scale between an X quantity and a Y quantity for each skill of the plurality of skills of the individual, with the X quantity being a lowest quantity and the Y quantity being a highest quantity assigned to an objective skill stage indicating a stage of mastery or stage of skill that the individual has achieved with respect to for each skill of the plurality of skills;

wherein the each of the plurality of skill stages is qualitatively different from other skill stages and is associated with a subcategory of a plurality of subcategories in the skill assessment progression, comprising a non-linear progression of a skill that identifies different levels of mastery for each skill such that each stage of a skill is not a linear progression of a previous skill stage, the plurality of subcategories in ascending order consisting of a not-prioritized level, a prioritized level, a doing level, a ready to teach level, a teaching level, a tool-builder level, and an inventing level, in such a way that the X quantity is within the not-prioritized level subcategory and the Y quantity is within the inventing level subcategory; and transforming the plurality of skill stages, each being associated with a skill weight, into an average skill weight, wherein a weighted average of the skill weights for each of the skill stages are utilized to calculate compensation.

8. The method of claim 1, wherein:
each individual within the organization is assigned a position within the organization and provided with a skills map pre-populated by skills, with the skills map and user assessment module making skills maps and mapping out sets of skills in the skills maps for positions and each individual occupying positions within an organization, with each position including predetermined collections of skills associated therewith;

the skills map and user assessment module maintain a skill assessment progression that provides an objective skill progression for achieving different skill stages or levels of mastery of a skill for each skill included in the skills framework, wherein individuals progress through skill development in stages; and a user utilizes the graphical user interface to obtain a description of the skill or stages of the skill, and then interact with any skills on the skills map of the individual, triggering workflows, processes, and capabilities, wherein with the skills map provided, the individual or user updates the skills map to reflect the skills and skill stages possessed and/or required by the individual, including adding skills, removing skills, and/or modifying a skill stage of a skill.

9. A system of modeling compensation level determinations, the system comprising:
a processor and computing devices communicating over a telecommunication network;

a user interface receiving a skill stage for each skill in a collection of skills associated with an individual, the skill stage indicating a level of mastery the individual has obtained in each skill;

a skills map and user assessment module configured to generate a graphical user interface conveying information to the individual and receiving data related to the individual comprising skills maps associated with the individual, the skills map and user assessment module making skills maps and mapping out sets of skills in the skills maps for positions and each individual occupying positions within an organization, wherein the collection of skills becomes a skills map for the individual;

the skills map and user assessment module maintaining a skill assessment progression that provides an objective skill progression for achieving different skill stages or levels of mastery of a skill for each skill included in a skills framework, wherein individuals progress through skill development in stages, providing a structured evaluation system for observable behaviors of individuals rather than subjective criteria of performance, wherein an artifacts module captures and stores artifacts of qualifications for performing each skill and the skill assessment progression is derived by identifying skills for an individual and identifying different levels of mastery for each skill in the skills framework at which an individual is executing a skill;

the skills map and user assessment module and the processor determining a skill weight for each received skill stage for each skill in the collection of skills, the skill weight is a predetermined value multiplier based on the skill stage;

the skills map and user assessment module identifying one or more skill values assigned to each skill in the collection of skills, each of the one or more skill values associated with a value multiplier;

the skills map and user assessment module, using the processor, calculating an average skill value for each skill in the collection of skills by averaging all value multipliers associated with the one or more skill values;

the skills map and user assessment module transforming the skill weight for each skill in the collection of skills into a weighted skill weight for each skill in the collection of skills, wherein transforming comprises multiplying the average skill value for each skill in the collection of skills by the predetermined value multiplier of the skill weight for each skill in the collection of skills;

the skills map and user assessment module, using the processor, calculating total skill weights for the individual by summing the weighted skill weight for each skill in the collection of skills, the skills map and user assessment module storing, organizing, managing, and presenting skill stage assessments, wherein skill stages and associated skill values are created, modified, and deleted in a database and then re-evaluated, updated and accessed utilizing the graphical user interface; and a compensation calculation module computing compensation for individuals correlated to a value the individual contributes to the organization based on skill stage assessments provided by users against a comprehensive map of skills and calculating a compensation level determination for the individual by obtaining a product of the total skill weights multiplied by a predetermined monetary market value per skill weight.

10. The system of claim 9, wherein users upload documents or models via the artifacts module, and wherein skill stages do not represent levels of proficiency of an individual associated with a given skill but represent value to the organization by how greatly each stage contributes to overall performance of the organization, wherein the one or more skill values:

are one of a low quantity, medium quantity, high quantity, and very high quantity; and indicate a relative level of importance of an associated skill to an organization.

11. The system of claim 9, wherein the one or more skill values are provided by a weighting table for skill stages.

12. The system of claim 9, wherein the value multiplier is a predetermined quantity associated with a level of skill.

13. The system of claim 9, further comprising determining a compensation level for the individual based on the total skill weights for the individual.

14. The system of claim 13, wherein determining the compensation level comprises calculating a product of the total skill weights multiplied by a predetermined monetary market value per skill weight, and further comprises dictating a desired career path or a predicted compensation range following future evaluations.

15. The system of claim 13, further comprising:

receiving, from a plurality of users using computing devices, a plurality of skill stages on a scale between an X quantity and a Y quantity for each skill of the plurality of skills of the individual, with the X quantity being a lowest quantity and the Y quantity being a highest quantity assigned to an objective skill stage indicating a stage of mastery or stage of skill that the individual has achieved with respect to for each skill of the plurality of skills;

wherein the each of the plurality of skill stages is qualitatively different from other skill stages and is associated with a subcategory of a plurality of subcategories in the skill assessment progression, comprising a non-linear progression of a skill that identifies different levels of mastery for each skill such that each stage of a skill is not a linear progression of a previous skill stage, the plurality of subcategories in ascending order consisting of a not-prioritized level, a prioritized level, a doing level, a ready to teach level, a teaching level, a tool-builder level, and an inventing level, in such a way that the X quantity is within the not-prioritized level subcategory and the Y quantity is within the inventing level subcategory; and transforming the plurality of skill stages, each being associated with a skill weight, into an average skill weight, wherein a weighted average of the skill weights for each of the skill stages are utilized to calculate compensation.

* * * * *